(12) United States Patent
Beck et al.

(10) Patent No.: US 9,660,267 B2
(45) Date of Patent: May 23, 2017

(54) HIGH POWER ELECTRODE MATERIALS

(71) Applicant: A123 Systems, LLC, Waltham, MA (US)

(72) Inventors: Larry Beck, Ann Arbor, MI (US); Jennifer Wilson, New Boston, MI (US); Chuanjing Xu, Ann Arbor, MI (US); Zhong-You Shi, Ann Arbor, MI (US); Maha Hammoud, Westland, MI (US)

(73) Assignee: A123 Systems, LLC, Waltham, MA (US)

( * ) Notice: Subject to any disclaimer, the term of this patent is extended or adjusted under 35 U.S.C. 154(b) by 0 days.

(21) Appl. No.: 14/641,172

(22) Filed: Mar. 6, 2015

(65) Prior Publication Data

US 2015/0180022 A1 Jun. 25, 2015

Related U.S. Application Data

(63) Continuation-in-part of application No. 12/885,907, filed on Sep. 20, 2010, now Pat. No. 9,174,846.

(Continued)

(51) Int. Cl.
*H01M 4/58* (2010.01)
*C01B 25/45* (2006.01)
(Continued)

(52) U.S. Cl.
CPC ......... *H01M 4/5825* (2013.01); *C01B 25/375* (2013.01); *C01B 25/45* (2013.01);
(Continued)

(58) Field of Classification Search
None
See application file for complete search history.

(56) References Cited

U.S. PATENT DOCUMENTS 3,070,423 A 12/1962 Alexander et al.
3,407,034 A 10/1968 Bennetch
(Continued)

FOREIGN PATENT DOCUMENTS

CN 1105047 A 7/1995
CN 1549385 A 11/2004
(Continued)

OTHER PUBLICATIONS

Choudhury et al(A synthetic iron phosphate mineral, spheniscidite, [NH4]+[Fe2(OH)(H2O)(PO4)2]-H2O, exhibiting reversible dehydration, Proc, Indian Acad. Sci., vol. 111, No. 5, (1999), pp. 627-637).*

(Continued)

*Primary Examiner* — Melvin C Mayes
*Assistant Examiner* — Michael Forrest
(74) *Attorney, Agent, or Firm* — McCoy Russell LLP

(57) ABSTRACT

An LFP electrode material is provided which has improved impedance, power during cold cranking, rate capacity retention, charge transfer resistance over the current LFP based cathode materials. The electrode material comprises crystalline primary particles and secondary particles, where the primary particle is formed from a plate-shaped single-phase spheniscidite precursor and a lithium source. The LFP includes an LFP phase behavior where the LFP phase behavior includes an extended solid-solution range.

5 Claims, 26 Drawing Sheets

Related U.S. Application Data

(60) Provisional application No. 61/949,596, filed on Mar. 7, 2014, provisional application No. 62/103,987, filed on Jan. 15, 2015, provisional application No. 61/264,951, filed on Nov. 30, 2009, provisional application No. 61/243,846, filed on Sep. 18, 2009.

(51) Int. Cl.
    *H01M 10/0525*    (2010.01)
    *H01M 4/587*    (2010.01)
    *C01B 25/37*    (2006.01)
    *H01M 4/136*    (2010.01)

(52) U.S. Cl.
    CPC .......... *C01B 25/451* (2013.01); *H01M 4/136* (2013.01); *H01M 4/587* (2013.01); *H01M 10/0525* (2013.01); *C01P 2006/40* (2013.01); *H01M 2300/0028* (2013.01)

(56) References Cited

U.S. PATENT DOCUMENTS

| | | | |
|---|---|---|---|
| 4,144,163 A | 3/1979 | Kolm | |
| 4,374,109 A | 2/1983 | Ruszala et al. | |
| 5,030,285 A | 7/1991 | Vallvey et al. | |
| 5,053,297 A | 10/1991 | Yamahira et al. | |
| 5,278,000 A | 1/1994 | Huang et al. | |
| 5,691,083 A | 11/1997 | Bolster | |
| 5,910,382 A | 6/1999 | Goodenough et al. | |
| 6,514,640 B1 | 2/2003 | Armand et al. | |
| 6,528,003 B1 | 3/2003 | Sano et al. | |
| 6,599,662 B1 | 7/2003 | Chiang et al. | |
| 6,656,635 B2 | 12/2003 | Okawa et al. | |
| 6,723,470 B2 | 4/2004 | Barker et al. | |
| 6,730,281 B2 | 5/2004 | Barker et al. | |
| 6,749,967 B2 | 6/2004 | Li et al. | |
| 6,787,232 B1 | 9/2004 | Chiang et al. | |
| 6,815,122 B2 | 11/2004 | Barker et al. | |
| 6,855,273 B2 | 2/2005 | Ravet et al. | |
| 6,884,544 B2 | 4/2005 | Barker et al. | |
| 7,001,690 B2 | 2/2006 | Barker et al. | |
| 7,026,072 B2 | 4/2006 | Barker et al. | |
| 7,190,171 B2 | 3/2007 | Kawakami et al. | |
| 7,233,128 B2 | 6/2007 | Brost et al. | |
| 7,282,300 B2 | 10/2007 | Goh et al. | |
| 7,282,301 B2 | 10/2007 | Wixom et al. | |
| 7,338,734 B2 | 3/2008 | Chiang et al. | |
| 7,371,482 B2 | 5/2008 | Wurm et al. | |
| 7,524,529 B2 | 4/2009 | Yang | |
| 7,842,420 B2 | 11/2010 | Wixom et al. | |
| 7,988,879 B2 | 8/2011 | Park et al. | |
| 8,187,735 B2 | 5/2012 | Chiang et al. | |
| 2001/0055718 A1 | 12/2001 | Li et al. | |
| 2002/0004169 A1 | 1/2002 | Yamada et al. | |
| 2002/0039687 A1 | 4/2002 | Barker et al. | |
| 2002/0047112 A1 | 4/2002 | Hosoya et al. | |
| 2003/0129492 A1 | 7/2003 | Barker et al. | |
| 2004/0005265 A1 | 1/2004 | Chiang et al. | |
| 2004/0018430 A1 | 1/2004 | Holman et al. | |
| 2004/0033360 A1 | 2/2004 | Armand et al. | |
| 2004/0086445 A1 | 5/2004 | Armand et al. | |
| 2004/0175614 A1 | 9/2004 | Wurm et al. | |
| 2004/0197654 A1 | 10/2004 | Barker et al. | |
| 2004/0257045 A1 | 12/2004 | Sada et al. | |
| 2005/0186476 A1 | 8/2005 | Barker et al. | |
| 2005/0233219 A1 | 10/2005 | Gozdz et al. | |
| 2005/0266303 A1 | 12/2005 | Kadouchi et al. | |
| 2006/0093919 A1 | 5/2006 | Wixom et al. | |
| 2006/0127750 A1 | 6/2006 | Okada et al. | |
| 2006/0127767 A1 | 6/2006 | Gauthier et al. | |
| 2007/0015055 A1 | 1/2007 | Lee et al. | |
| 2007/0141468 A1 | 6/2007 | Barker | |
| 2007/0175830 A1 | 8/2007 | Brassard | |
| 2007/0292747 A1 | 12/2007 | Chiang et al. | |
| 2008/0138709 A1 | 6/2008 | Hatta et al. | |
| 2008/0274210 A1 | 11/2008 | Chan et al. | |
| 2009/0008237 A1 | 1/2009 | Yoshida et al. | |
| 2009/0039307 A1 | 2/2009 | Nakaoka et al. | |
| 2009/0123813 A1 | 5/2009 | Chiang et al. | |
| 2009/0186277 A1 | 7/2009 | Beck et al. | |
| 2010/0028777 A1 | 2/2010 | Ueda et al. | |
| 2010/0178562 A1 | 7/2010 | Exnar et al. | |
| 2010/0183924 A1 | 7/2010 | Song et al. | |
| 2011/0052988 A1 | 3/2011 | Beck et al. | |
| 2011/0068295 A1 | 3/2011 | Beck et al. | |
| 2011/0068298 A1 | 3/2011 | Wixom et al. | |
| 2011/0117003 A1 | 5/2011 | Wissemborski et al. | |
| 2012/0039783 A1 | 2/2012 | Buhler et al. | |
| 2013/0244100 A1 | 9/2013 | Tan et al. | |

FOREIGN PATENT DOCUMENTS

| | | |
|---|---|---|
| CN | 1930711 A | 3/2007 |
| CN | 101172595 A | 5/2008 |
| CN | 101462704 A | 6/2009 |
| CN | 101481104 A | 7/2009 |
| CN | 101659406 A | 3/2010 |
| EP | 1150368 A2 | 10/2001 |
| EP | 2383820 A1 | 11/2011 |
| GB | 1162711 A | 8/1969 |
| JP | S4612289 B | 3/1971 |
| JP | S51148865 A | 12/1976 |
| JP | H03218911 A | 9/1991 |
| JP | H06239604 A | 8/1994 |
| JP | H1121114 A | 1/1996 |
| JP | 2003123742 A | 4/2003 |
| JP | 2003187799 A | 7/2003 |
| JP | 2003292307 A | 10/2003 |
| JP | 2003292309 A | 10/2003 |
| JP | 2004063422 A | 2/2004 |
| JP | 2004359538 A | 12/2004 |
| JP | 2005014637 A | 1/2005 |
| JP | 2005015282 A | 1/2005 |
| JP | 2006518391 A | 8/2006 |
| JP | 2007128723 A | 5/2007 |
| JP | 2007134274 A | 5/2007 |
| JP | 2007518231 A | 7/2007 |
| JP | 2009029663 A | 2/2009 |
| JP | 2009164062 A | 7/2009 |
| JP | 4403244 B2 | 1/2010 |
| JP | 2010135238 A | 6/2010 |
| JP | 2011500492 A | 1/2011 |
| JP | 2011510457 A | 3/2011 |
| JP | 2012012279 A | 1/2012 |
| JP | 2012518594 A | 8/2012 |
| KR | 1020040033278 A | 4/2004 |
| KR | 1020040073505 A | 8/2004 |
| KR | 1020040111470 A | 12/2004 |
| KR | 1020060132576 A | 12/2006 |
| SU | 1724570 A1 | 4/1992 |
| TW | 200915640 A | 4/2009 |
| TW | 200925107 A | 6/2009 |
| WO | 0230815 A1 | 4/2002 |
| WO | 03056646 A1 | 7/2003 |
| WO | 0385757 A1 | 10/2003 |
| WO | 2004036672 A1 | 4/2004 |
| WO | 2005041327 A1 | 5/2005 |
| WO | 2005069405 A2 | 7/2005 |
| WO | 2007030816 A2 | 3/2007 |
| WO | 2009050055 A2 | 4/2009 |
| WO | 2010067559 A1 | 6/2010 |
| WO | 2010097341 A1 | 9/2010 |
| WO | 2011030786 A1 | 3/2011 |

OTHER PUBLICATIONS

Japanese Patent Office, Office Action Issued in Japanese Patent Application No. 2012-529960, Feb. 3, 2015, 10 pages.
Schumb, W. et al., "Hydrogen Peroxide(excerpt from)," American Chemical Society Monograph Series, Reinhold Publishing Corporation, New York, N.Y., 1955, 4 pages.

(56) References Cited

OTHER PUBLICATIONS

Jang, Y. et al., "Electrochemical Cycling-Induced Spinel Formation in High-Charge-Capacity Orthorhombic LiMnO2," Journal of the Electrochemical Society, vol. 146, No. 9, Sep. 1999, 8 pages.
Jang, Y. et al., "Stability of the Monoclinic and Orthorhombic Phases of LiMnO2 with Temperature, Oxygen Partial Pressure, and Al Doping," Solid State Ionics, vol. 130, No. 1-2, May 2000, 8 pages.
Trobajo, C. et al., "Hydrothermal Synthesis of Iron(III) Phosphates in the Presence of Urea," Journal of the Chemical Society, Dalton Transactions, Issue No. 5, Feb. 14, 2000, 5 pages.
Yamada, A. et al., "Phase Diagram of Lix(MnyFe1-y)PO4 ($0 \leq x,y \leq 1$)," Journal of the Electrochemical Society, vol. 148, No. 10, Oct. 2001, Published Online Sep. 11, 2001, 7 pages.
Berbenni, V. et al., "Thermogravimetry and X-Ray Diffraction Study of the Thermal Decomposition Processes in Li2CO3-MnCO3 Mixtures," Journal of Analytical and Applied Pyrolysis, vol. 62, No. 1, Jan. 2002, 19 pages.
Prosini, P. et al., "Synthesis and Characterization of Amorphous Hydrated FePO4 and Its Electrode Performance in Lithium Batteries," Journal of the Electrochemical Society, vol. 149, No. 3, Mar. 2002, Published Online Jan. 30, 2002, 5 pages.
Song, Y. et al., "New Iron(III) Phosphate Phases: Crystal Structure and Electrochemical and Magnetic Properties," Inorganic Chemistry, vol. 41, No. 22, Nov. 4, 2002, Published Online Oct. 11, 2002, 9 pages.
Scaccia, S. et al., "Thermoanalytical Investigation of Nanocrystalline Iron (II) Phosphate Obtained by Spontaneous Precipitation from Aqueous Solutions," Thermochimica Acta, vol. 397, No. 1-2, Feb. 2003, 7 pages.
Reale, P. et al., "Synthesis and Thermal Behavior of Crystalline Hydrated Iron(III) Phosphates of Interest as Positive Electrodes in Li Batteries," Chemistry of Materials, vol. 15, No. 26, Dec. 30, 2003, Published Online Dec. 4, 2003, 9 pages.
Yonemura, M. et al., "Comparative Kinetic Study of Olivine LixMPO4 (M = Fe, Mn)," Journal of the Electrochemical Society, vol. 151, No. 9, Sep. 2004, Published Online Aug. 9, 2004, 6 pages.
Wang, D. et al., "Improving the Rate Performance of LiFePO4 by Fe-Site Doping," Electrochimica Acta, vol. 50, No. 14, May 5, 2005, Published Online Jan. 18, 2005, 4 pages.
Striebel, K. et al., "Comparision of LiFePO4 from Different Sources," Journal of the Electrochemical Society, vol. 152, No. 4, Apr. 2005, Published Online Feb. 10, 2005, 8 pages.
Zhu, B. et al., "Novel Synthesis of LiFePO4 by Aqueous Precipitation and Carbothermal Reduction," Materials Chemistry and Physics, vol. 98, No. 2-3, Aug. 1, 2006, 4 pages.
Meethong, N. et al., "Size-Dependent Lithium Miscibility Gap in Nanoscale Li1-xFePO4," Electrochemical and Solid-State Letters, vol. 10, No. 5, May 2007, Published Online Mar. 14, 2007, 5 pages.
Meethong, N. et al., "Strain Accommodation during Phase Transformations in Olivine-Based Cathodes as a Materials Selection Criterion for High-Powered Rechargeable Batteries," Advanced Functional Materials, vol. 17, No. 7, May 2007, Published Online Mar. 21, 2007, 9 pages.
Lee, H. et al., "Li2NiO2 as a Novel Cathode Additive for Overdischarge Protection of Li-Ion Batteries," Chemistry of Materials, vol. 20, No. 1, Jan. 8, 2008, Published Online Dec. 6, 2007, 4 pages.
ISA Korean Intellectual Property Office, International Search Report and Written Opinion Issued in Application No. PCT/US2008/069858, Jan. 20, 2009, WIPO, 11 pages.
ISA Korean Intellectual Property Office, International Search Report Issued in Application No. PCT/US2009/031552, Sep. 1, 2009, WIPO, 3 pages.
Cao, S. et al., "Iron Hydroxyl Phosphate Microspheres: Microwave-Solvothermal Ionic Liquid Synthesis, Morphology Control, and Photoluminescent Properties," Journal of Solid State Chemistry, vol. 183, No. 7, Jul. 2010, Published Online May 27, 2010, 7 pages.
ISA United States Patent and Trademark Office, International Search Report and Written Opinion Issued in Application No. PCT/US2010/046646, Oct. 18, 2010, WIPO, 3 pages.
ISA United States Patent and Trademark Office, International Search Report and Written Opinion Issued in Application No. PCT/US2010/049480, Feb. 1, 2011, WIPO, 5 pages.
Japanese Patent Office, Office Action Issued in Japanese Patent Application No. 2010-516283, Jan. 22, 2013, 7 pages.
Taiwan Intellectual Property Office, Office Action Issued in Taiwanese Patent Application No. 097126662, Jul. 2, 2013, 12 pages.
State Intellectual Property Office of the People's Republic of China, Office Action Issued in Chinese Patent Application No. 200880105630.8, Jul. 9, 2013, 10 pages.
Japanese Patent Office, Office Action Issued in Japanese Patent Application No. 2010-516283, Nov. 26, 2013, 7 pages.
State Intellectual Property Office of the People's Republic of China, Office Action Issued in Chinese Patent Application No. 201080048376.X, Feb. 28, 2014, 17 pages.
European Patent Office, Extended European Search Report Issued in Application No. 10812582.4, May 8, 2014, 7 pages.
Taiwan Intellectual Property Office, Office Action Issued in Taiwanese Patent Application No. 099128478, Aug. 5, 2014, 7 pages. (Submitted with abridged translation).
European Patent Office, Extended European Search Report Issued in Application No. 08796171.0, Aug. 14, 2014, 7 pages.
Taiwan Intellectual Property Office, Office Action Issued in Taiwanese Patent Application No. 099131826, Aug. 20, 2014, 24 pages. (Submitted with abridged translation).
Korean Intellectual Property Office, Notice of Allowance Issued in Korean Patent Application No. 10-2010-7003179, Dec. 16, 2014, 3 pages.
Intellectual Property Office of Chile, Office Action Issued in Chilean Patent Application No. 00681-2012, Dec. 27, 2014, 16 pages.
Intellectual Property Office of Chile, Office Action Issued in Chilean Patent Application No. 00681-2012, May 22, 2015, 15 pages.
European Patent Office, Office Action Issued in European Patent Application No. 10812582.4, May 28, 2015, Netherlands, 5 pages.
ISA Korean Intellectual Property Office, International Search Report and Written Opinion Issued in Application No. PCT/US2015/019313, Jun. 24, 2015, WIPO, 11 pages.
Database CA [Online] Chemical Abstracts Service, Columbus, Ohio, US; Feb. 5, 2009 (Feb. 5, 2009), Zheng, Jun-Chao et al: "Effect of pH value on performance of FePO4.xH20 and LiFePO4 in synthesis process", XP005253299, retrieved from STN Database accession No. 150:125020 *abstract* & Zheng, Jun-Chao et al: "Effect of pH value on performance of FePO4.cntdot.xH2O and LiFePO4 in synthesis process", Zhongguo Youse Junshu Xuebao, 18(5), 867-872 CODEN: ZYJXFK; ISSN: 1004-0609,2008, 1 page.
European Patent Office, Supplementary Partial European Search Report Issued in Application No. EP10817968, Jul. 20, 2016, Netherlands, 7 pages.
Scaccia, S. et al., "Thermoanalytical investigation of iron phosphate obtained by spontaneous precipitation from aqueous solutions," Thermochimica Acta, vol. 383, No. 1-2, Feb. 2002, Published Online Jan. 8, 2002, 8 pages.
European Patent Office, Extended European Search Report Issued in Application No. 10817968.0, Nov. 18, 2016, Germany, 23 pages.

* cited by examiner

HIGH POWER ELECTRODE MATERIALS

CROSS-REFERENCE TO RELATED APPLICATIONS

The present application is a continuation-in-part of U.S. application Ser. No. 12/885,907, entitled "FERRIC PHOSPHATE AND METHODS OF PREPARATION THEREOF," filed Sep. 20, 2010, now U.S. Pat. No. 9,174,846, which claims priority to U.S. Provisional Patent Application No. 61/264,951, entitled "FERRIC PHOSPHATE AND METHODS OF PREPARATION THEREOF," filed Nov. 30, 2009, and U.S. Provisional Patent Application No. 61/243,846, entitled "FERRIC PHOSPHATE DIHYDRATE AS LITHIUM IRON PHOSPHATE SYNTHETIC PRECURSOR AND METHOD OF PREPARATION THEREOF," filed Sep. 18, 2009, and the present application claims priority to U.S. Provisional Patent Application No. 61/949,596, entitled "HIGH POWER ELECTRODE MATERIALS," filed Mar. 7, 2014, and U.S. Provisional Patent Application No. 62/103,987, entitled "HIGH POWER ELECTRODE MATERIALS," filed Jan. 15, 2015, the entire contents of each of which are hereby incorporated by reference for all purposes.

FIELD OF THE INVENTION

This application relates to materials and methods for battery electrodes, materials used therein, and electrochemical cells using such electrodes and methods of manufacture, such as lithium secondary batteries.

BACKGROUND AND SUMMARY

Lithium-ion (Li-ion) batteries are a type of rechargeable battery which produce energy from electrochemical reactions. In a typical lithium ion battery, the cell may include a positive electrode, a negative electrode, an ionic electrolyte solution that supports the movement of ions back and forth between the two electrodes, and a porous separator which allows ion movement between the electrodes and ensures that the two electrodes do not touch.

Li-ion batteries may comprise metal oxides for the positive electrode (herein also referred to as a cathode) and carbon/graphite for the negative electrode (herein also referred to as an anode), and a salt in an organic solvent, typically a lithium salt, as the ionic electrolyte solution. During charge the anode intercalates lithium ions from the cathode and during discharge releases the ions back to the cathode. Recently, lithium metal phosphates, for example lithium iron phosphates, have found use as a cathode electroactive material.

The use of lithium iron phosphate (LFP) provides a next generation replacement for the more hazardous lithium cobalt oxide that is currently used in commercial lithium ion batteries. Li-ion batteries using LFP based cathode materials may currently be found in cordless hand tools and on-board UPS devices. Battery packs have recently been demonstrated for transportation including aviation and electric vehicles as well as plug-in hybrid electric vehicle automobiles and buses.

The characteristics for current LFP materials for use in batteries are often different from or in contradiction with those for other intended purposes. Impurities which may be present due to the synthesis may be detrimental to Li-ion batteries. Furthermore, different batches during synthesis of commercially available LFP materials may often have inconsistent properties. Thus, an LFP material with carefully controlled characteristics is needed which provides consistent and desirable properties for use in Li-ion batteries.

Current LFP materials for use in Li-ion batteries are synthesized from various starting reagents and have a range of characteristics. For example, in U.S. Pat. No. 8,541,136 (Beck et al) provides an LFP material which includes excess lithium and a surface area of 45.5 $m^2/g$ to improve discharge rate capabilities. In another example, US 2011/006829 (Beck et al) provides a high purity crystalline phase LFP which is synthesized from a high purity crystalline ferric phosphate material, hereby incorporated by reference for all purposes.

However, the inventors herein have recognized potential issues with the current generation of LFP based cathode materials. The current LFP materials may have limited use in extreme temperature environments, such as exposure to temperature at or below 0° C., as the energy of the Li-ion battery may be too low. Thus, the LFP materials for use in Li-ion batteries need improvements in energy in extreme temperature environments to be used in a broader range of applications. Further, it was recognized that improvements with regards to impedance, power during cold cranking, high rate capacity retention, and charge transfer resistance would improve the current generation of LFP based cathode materials.

One potential approach as found by the inventors to at least address some of the above issues includes synthesizing a plate-shaped spheniscidite precursor which can be used to produce an improved electrode material, also referred to as the LFP material. The plate-shaped precursor may be formed as a single-phase material, and, in some embodiments, may have a surface area in a range of 20 $m^2/g$ to 25 $m^2/g$, as disclosed in U.S. Provisional Patent Application No. 61/949,596, entitled "HIGH-POWER ELECTRODE MATERIALS," filed Mar. 7, 2014, the entire contents of which are hereby incorporated by reference for all purposes.

The LFP material formed from the plate-shaped spheniscidite precursor, herein also referred to as an ammonium iron phosphate precursor, may comprise crystalline primary and secondary particles. The primary particles may have a particle size between about 20 nm to about 80 nm. The secondary particles may have a d50 particle size in the range of 5 microns to 13 microns. In some examples, the secondary particles may have a surface area of in a range of 25 $m^2/g$ to 35 $m^2/g$. Further, the secondary particles may have a tap density from about 0.8 g/mL to 1.4 g/mL.

In some examples, the LFP material may contain less than about 5 weight percent of any additional phase that does not substantially store ions. Further, the LFP material, in some embodiments, may have a carbon percentage in the range of 2.1% to 2.5%.

As provided in detail in the description below, the disclosed LFP material may provide improved battery properties in extreme temperature environments. For example, the LFP material may have improved capacity at low temperature, wherein the low temperature may be at or below 0° C. Moreover, the LFP material provides for improved impedance, increased power during cold cranking, increased high rate capacity retention, and improved charge transfer resistance.

It will be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the

DETAILED DESCRIPTION

Figure 1A:
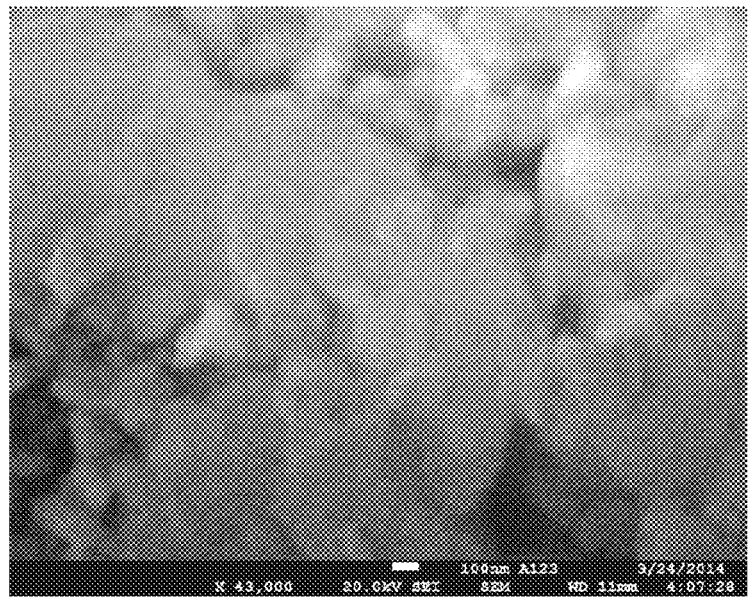
FIG. 1A shows an SEM image of the pure spheniscidite.

The present disclosure will now be described more fully hereinafter with reference to the accompanying drawings, in which exemplary embodiments of the invention are shown. The particular embodiment(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the processes or compositions are described as an order of individual steps or using specific materials, it is appreciated that steps or materials may be interchangeable such that the description of the invention may include multiple parts or steps arranged in many ways.

As used herein, it will be understood that when an element is referred to as being "on" another element, it can be directly on the other element or intervening elements may be present there between. In contrast, when an element is referred to as being "directly on" another element, there are no intervening elements present.

As used herein, it will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second (or other) element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" or "a mixture of" means a combination including at least one of the foregoing elements.

As used herein, the term about includes additional ranges slightly above or below a value without changing the physical characteristics or resultant properties.

As used herein, the single-phase spheniscidite refers to the spheniscidite with less than about 5 weight percent of any additional phase, such as phosphosiderite or other ammonium iron phosphate compounds. The single-phase of spheniscidite may be determined using XRD as described in relation to FIG. 6.

As used herein, the term substantially includes the majority of the sample having the specified property.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree.

Figure 1B:
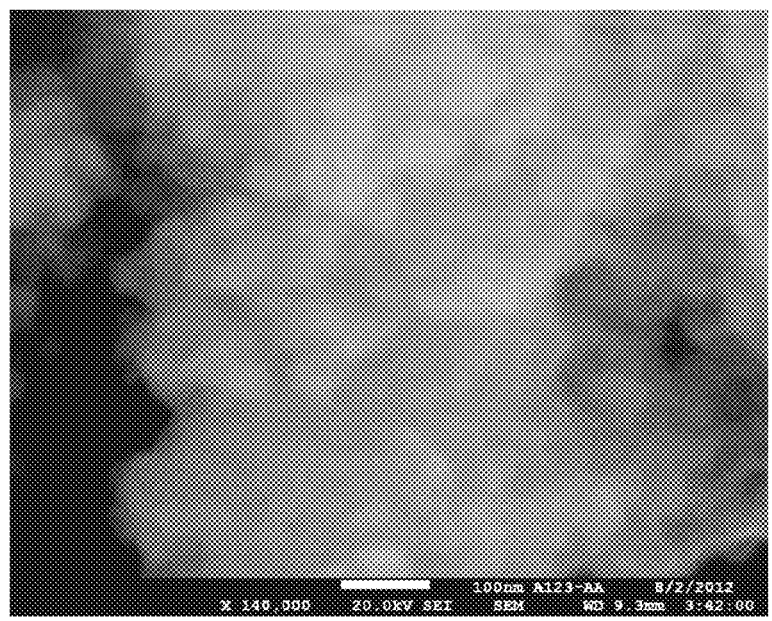
FIG. 1B shows an SEM image of the pure spheniscidite.
Figure 4:
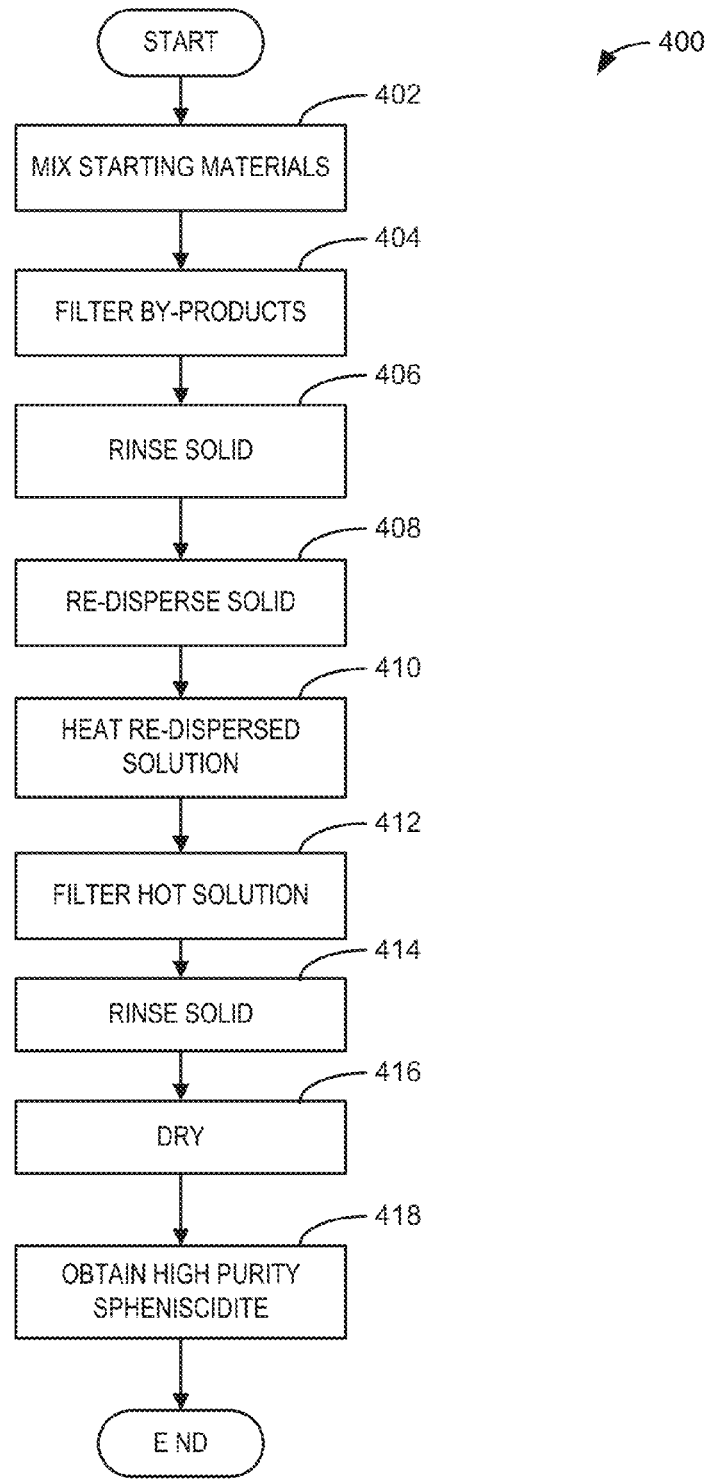
FIG. 4 illustrates an example method for synthesizing spheniscidite.
Figure 5:
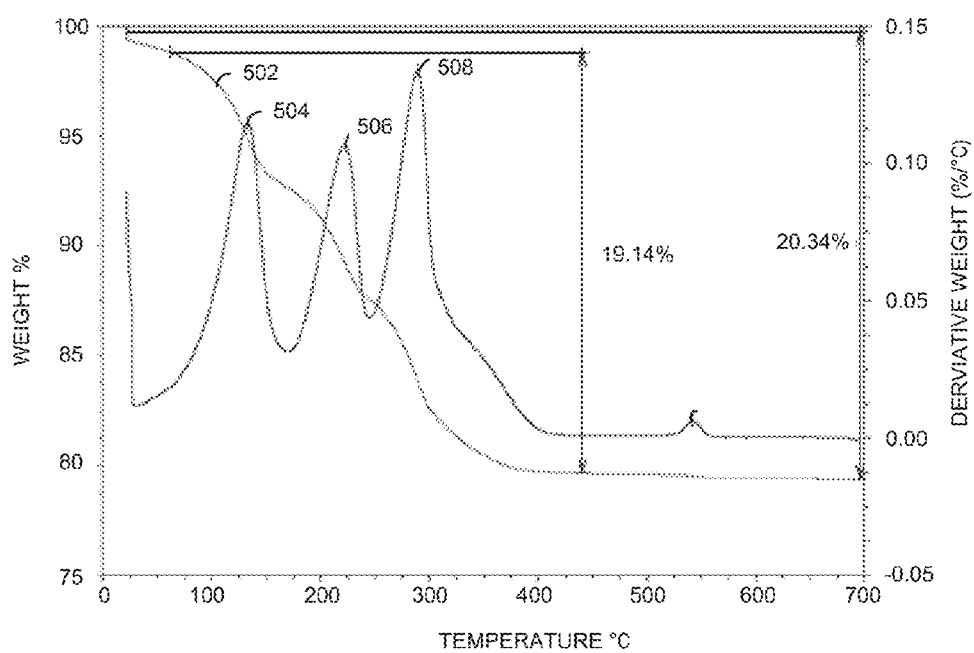
FIG. 5 shows a TGA curve of spheniscidite.
Figure 6:
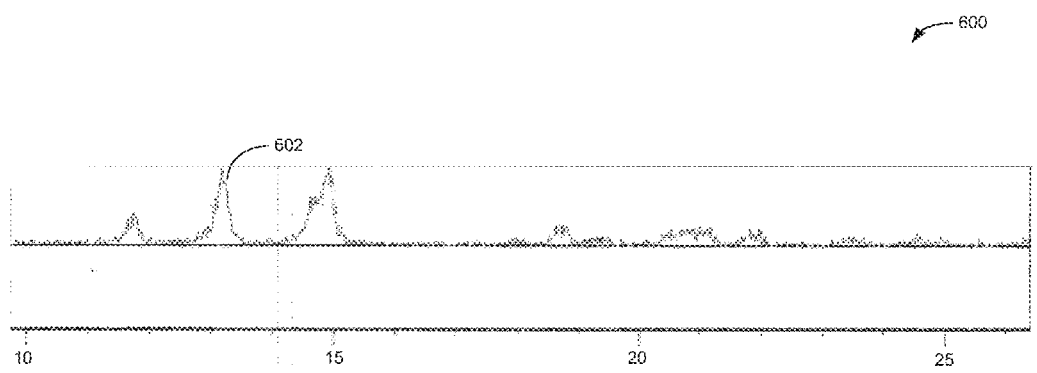
FIG. 6 shows an XRD pattern of pure spheniscidite.
Figure 25:
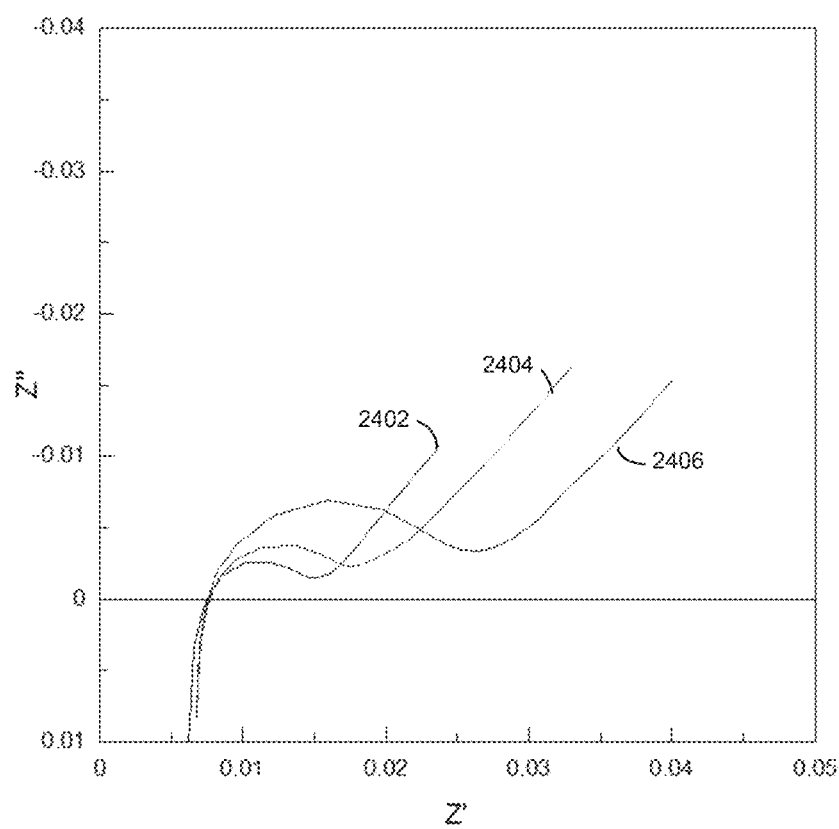
FIG. 25 shows the alternating current impedance for the LFP synthesized from spheniscidite compared to current LFP materials.
Figure 26:
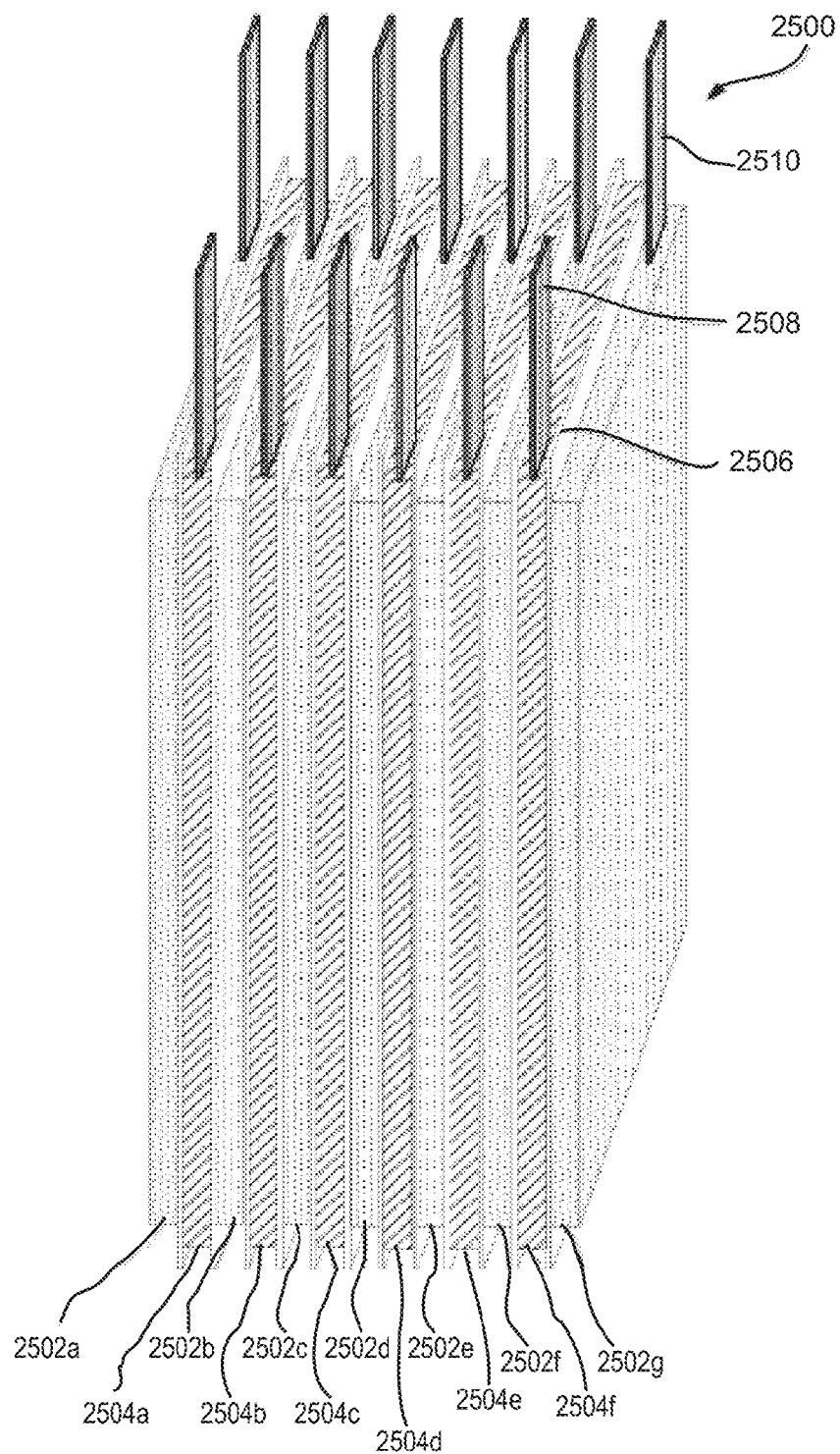
FIG. 26 shows an example electrode assembly.

The present disclosure provides a high-purity ammonium iron phosphate for use as the primary and/or sole iron phosphate source in the synthesis of nano-sized lithium iron phosphate (LFP) active primary particles for use in cathodes and the methods of making thereof. The ammonium iron phosphate, present as the spheniscidite precursor, provides plate-like particles, as illustrated in FIGS. 1A and 1B. This material may be used as a precursor for the synthesis of LFP active materials with a primary particle size of about 100 nm and a surface area in a range of 20 $m^2/g$ to 25 $m^2/g$. FIG. 4 provides an example method for producing the spheniscidite precursor to form a single-phase material with a high level of purity as illustrated in FIGS. 5 and 6. The high purity spheniscidite is then used as a precursor material to synthesize the LFP active material, an example method provided in FIG. 7, with a high surface area which demonstrates significantly higher power than current LFP materials. As illustrated in FIGS. 9 through 21, the LFP active material synthesized from the spheniscidite precursor for use in a battery, examples illustrated in FIGS. 25 and 26, provides improved properties and improved performance at extreme temperatures.

As provided above, a synthesized spheniscidite, also referred to as the spheniscidite precursor, is an ammonium iron phosphate compound with the formula of $NH_4Fe_2(PO_4)_2OH*2H_2O$ as the primary or sole iron phosphate component for the synthesis of the cathode material for use in lithium ion secondary batteries. Spheniscidite has a specific structure that possesses two 8-membered channels wherein the ammonium, $NH_4$, and ½ of the water molecules reside. The spheniscidite may include from about 35 wt. % to about 30 wt. % iron, about 15 wt. % to about 20 wt. % phosphorous, and about 4.6 wt. % to about 5.0 wt. % ammonium, wherein the use of the term about includes additional ranges slightly above or below a value without changing the physical characteristics or resultant properties. The use of a single-phase and pure spheniscidite as the sole iron phosphate component in the synthesis of LFP provides an LFP active material having a small primary particle size and a high surface area LFP cathode material which surprisingly results in electrochemical cells with improved electrochemical properties.

One aspect of the present disclosure provides methods for preparing spheniscidite, which is used as a precursor in the LFP synthesis. In some embodiments, the high-purity spheniscidite has a plate-like shape, as shown in SEMs in FIGS. 1A and 1B and may have less than about 10% total impurities present. With less than 10% total impurities, the materials may provide the improved properties disclosed herein. The impurities may include structural impurities determined from XRD and TGA, as well as, composition impurities, such as Na and/or $SO_4$ impurities, determined from ICP. For example, the pure synthesized spheniscidite may be free of K and Al, which appear in naturally occurring spheniscidite. In other embodiments, the spheniscidite may have less than about 5% impurities present. In yet other embodiments, the spheniscidite may have less than about 2.5% impurities present. In even other examples, the XRDs indicate no impurity peaks over 2%.

With regards to Na and/or $SO_4$ impurities, in some examples, there may be less than 2% of such impurities. For example, in an LFP material synthesized as disclosed herein, the ICP indicates that the Na and $SO_4$ impurities are less than .5%.

With regards to further characterizing the spheniscidite, the SEMs show the resultant spheniscidite has a plate like morphology with the primary plate particles being about 100 nm along the longest axis of the plate.

Another aspect of the present disclosure provides methods for preparing the LFP using the synthesized spheniscidite. One embodiment utilizes a solvent based system. Another embodiment utilizes a water based system. The solvent based system may provide particles which include 3D formations. In some examples, the 3D formations may include, but are not limited to, spherical shapes. In other examples, the 3D formations may include collapsed spheres or doughnut-like shaped formations. As another example, in the water based system, the particles may be substantially spherical.

Figure 2A:
FIG. 2A shows an SEM image of the primary particle of the LFP active material produced using a solvent based system.
Figure 2B:
FIG. 2B shows an SEM image of the primary particle of the LFP active material produced using a water based system.
Figure 3A:
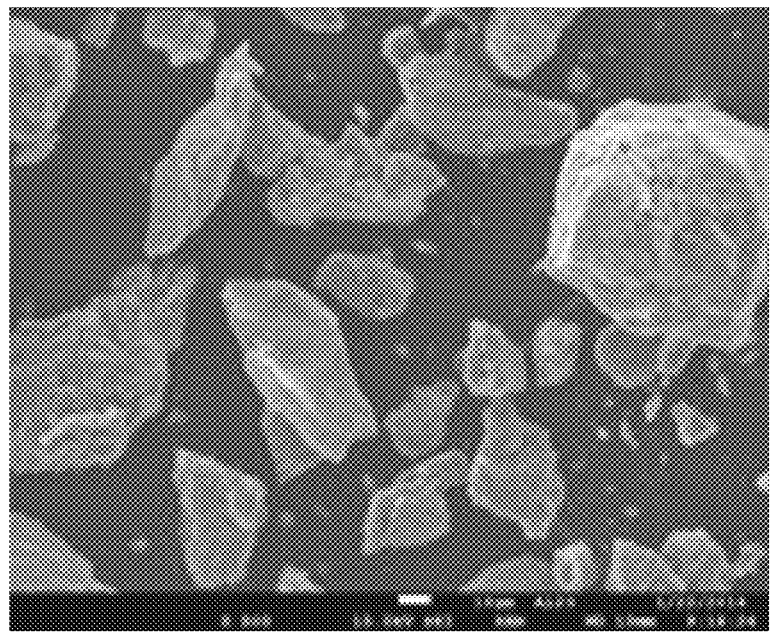
FIG. 3A shows an SEM image of the LFP active material using a solvent based system.
Figure 3B:
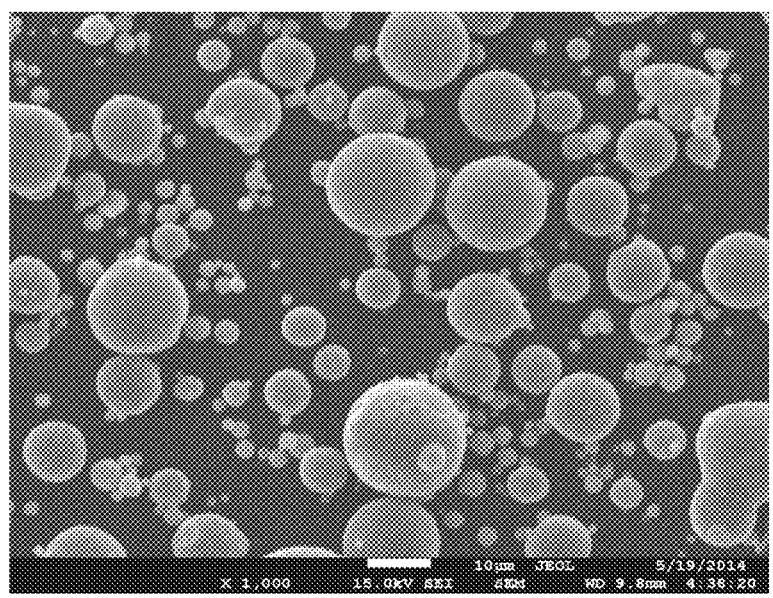
FIG. 3B shows an SEM image of the LFP active material using a water based system.

An LFP is produced which has a primary particle size of about 100 nm, regardless of the solvent system chosen, as illustrated in FIGS. 2A and 2B, a surface area in a range of 25 $m^2/g$ to 35 $m^2/g$, and a secondary d50 particle size in the range of 5 microns to 13 microns, as illustrated in SEMs in FIGS. 3A and 3B. As another example range, the secondary d50 particle size may be in the range of about 8 microns to 13 microns. For example, the secondary particles may have a d50 particle size of about 10 microns.

The methods provided herein include the steps of providing the raw materials to obtain pure spheniscidite, providing a lithium source as well as other reactants to mix with the obtained pure spheniscidite to produce the final LFP active material with the above mentioned properties.

Further, the methods include at least one of the steps of mixing, filtering, centrifuging, aging, drying, milling, and heating or a combination thereof.

Furthermore, the methods include the steps of mixing the materials in a pre-determined molar ratio and, at specific method steps, controlling the pH to be within a range of 3-8.5 at one step and controlling the pH to be within a range of about 2 to 4 in a subsequent step.

In an example method, an aqueous ferrous sulfate solution may be oxidized to a ferric ion to produce spheniscidite, as shown in equation 1 below. By this example method, an LFP material may be formed by the combination of spheniscidite and a lithium source material, as shown in equation 2 below. In this example, the lithium source is $Li_2CO_3$. The spheniscidite and the lithium source are combined to form a LFP active material suitable for use in a cathode of a lithium ion cell. A cathode active material is thus formed in a two-step reaction, wherein pure spheniscidite is produce during reaction 1 for subsequent use as a precursor material during reaction 2:

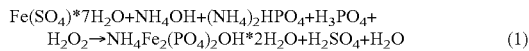

(1)

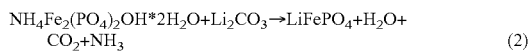

(2)

The spheniscidite may be obtained by reacting an iron source, an ammonium source, and an oxidant. The spheniscidite obtained has a single-phase and a high purity. The spheniscidite may have a surface area in a range of 20 $m^2/g$ to 25 $m^2/g$. For example, in some embodiments, the plate-shaped single-phase spheniscidite precursor may have a surface area of about 23 $m^2/g$.

In some embodiments, the iron source compound for making spheniscidite may be a ferrous salt. The ferrous salt may be hydrated or anhydrous. The ferrous salt, iron (II) salt, may be selected from iron (II) sulfate, iron (II) chloride, iron (II) nitrate, iron (II) oxalate, iron (II) oxide, any hydrate thereof, or a mixture thereof. In one example, iron (II) sulfate heptahydrate, $FeSO_4*7H_2O$ may be used as the iron source.

In some embodiments, the phosphate source for making spheniscidite may be selected from $H_3PO_4$, $P_2O_5$, $NH_4H_2PO_4$, $(NH_4)_2HPO_4$, $(NH_4)_3PO_4$, $NaH_2PO_4$, $Na_2HPO_4$, $Na_3PO_4$, or mixtures thereof. In one example, a mixture of $(NH_4)_2HPO_4$ and $H_3PO_4$ may be used. In another example, $(NH_4)_3PO_4$ may be used.

In some embodiments, the ammonium source may be selected from $NH_4H_2PO_4$, $(NH_4)_2HPO_4$, $(NH_4)_3PO_4$, $NH_4OH$ or mixtures thereof. In one example, $NH_4OH$ may be used.

In some embodiments, an oxidizing agent may be included. The oxidizing agent may be selected from $H_2O_2$, $Na_2O$, $NaClO_3$, or mixtures thereof. A non-limiting example of an oxidizing agent includes hydrogen peroxide, $H_2O_2$.

Turning to FIG. 4, an example method 400 for synthesizing spheniscidite with a high purity is outlined. For example, the method may include the reactants of reaction 1 above, wherein during reaction 1, the ferrous ion, $Fe^{2+}$, is oxidized to the ferric ion, $Fe^{3+}$, to form spheniscidite. In one example, method 400 may include the material processing for reaction 1 including mixing of starting materials, filtering by-products, heating slurry for crystallization, final filtration, and washing with hot solvent, such as water.

At 402, the method may include mixing the starting materials. For example, the iron source, phosphate source, ammonium source, and oxidizing agent are mixed. The starting materials may be mixed at specific molar ratios. For example, the NH4:PO4 molar ratio may be between about 1.8 to about 3.5, or about 2.0 to about 3.1. In one example, the solid starting materials may be dissolved in deionized water prior to mixing the starting materials. In another example, the starting materials may be mixed together in a specific ordering. As outlined in reaction 1, one example of mixing the starting materials includes mixing $FeSO_4*7H_2O$, $(NH_4)PO_4$, $H_2O_2$, PO4, and $NH_4OH$. The mixture compris-ing the starting materials may have a pH of about 3 to about 8.5. The mixture may be stirred for a time before proceeding to step 404.

At 404, the method may include filtering the by-products. In one example, the mixture from 402 may be centrifuged to separate the by-products. In another example, the mixture from 402 may be filter pressed to separate the by-products. The filtering of the by-products may be performed multiple times to separate fully the by-products. For example, the solution is filtered by centrifuge three times.

At 406, the method may include rinsing the solid obtained during filtering at 404. For example, the solid may be rinsed with hot deionized water. In one example, the solid may be rinsed with hot water multiple times. In another example, the solid may be continuously rinsed for a period of time.

At 408, the method may include re-dispersing the rinsed solid from 406. For example, the solid, also referred to as material cakes, may be re-dispersed in deionized water comprising an acid. The solution of the re-dispersed solid in deionized water may have a pH controlled to be in the range of about 1.8 to about 3.1.

At 410, the method may include heating the re-dispersed solid solution from 408. In some examples, the solution may be heated in a select temperature range, for example, and not as a limitation, a temperature at or above 85° C. to at or below 95° C. may be used for a time period. In one example, the entire solution may be heated.

At 412, the method may include filtering the hot solution from 410. In one example, the solution may be filtered using a filter press. In another example, the solution may be filtered using flask filtration.

At 414, the method may include rinsing the solid recovered at 412 with hot deionized water. In one example, the rinsing may be done multiple times over a period of time. In another example, the rinsing may be done continuously over a period to time.

At 416, the method may include drying the rinsed solid from 414. The solid may be dried at a temperature which removes any volatile compounds present and not desired in the final product.

At 418, the method may include obtaining the spheniscidite. As discussed above, the spheniscidite may have a high purity wherein less than 10% of impurities are present in the spheniscidite, not including iron phosphate materials. For example, the total impurities left in the final product may be less than 10%, and such material may be considered herein as substantially free of impurities. The level of impurities may be determined by ICP, in one example. In other examples, the level of impurities in the spheniscidite may be less than 5%. In yet another example, the level of impurities may be less than 2.5%. The method may then end.

As provided above, a crystalline spheniscidite material, herein also referred to as ammonium iron phosphate material, may be formed. In one non-limiting example, the crystalline spheniscidite material may include from about 25 wt. % to about 30 wt. % iron and from about 15 wt. % to about 20 wt. % phosphorous, and from about 4.6 wt. % to about 5.0 wt. % ammonium; wherein a molar ratio of phosphorus to iron is from about 1 to about 1.25. Further, the ammonium iron phosphate may be substantially free of impurities, wherein an XRD may include no impurity peaks over 2%. In some examples, the crystalline spheniscidite material may be a single-phase. Further, in some examples, the crystalline spheniscidite material may have a surface area in the range 20 $m^2/g$ to 25 $m^2/g$.

A high purity spheniscidite further may be determined by TGA and/or XRD illustrated in FIGS. 5 and 6 respectively.

A high purity spheniscidite product may be determined by the substantial absence of any peaks in the XRD or TGA which correspond to iron phosphates materials of morphologies other than spheniscidite.

Turning to FIG. 5, a TGA curve 500 of spheniscidite is provided. The TGA curve 502 has a specific shape for the decomposition of pure spheniscidite. The derivative TGA curve shows three peaks 504, 506, and 508, which are obtained at specific temperatures. Thus, the TGA curve may be used to confirm the purity of spheniscidite synthesized, for example using method 400.

Turning to FIG. 6, an XRD pattern 600 of spheniscidite is provided. The XRD curve 602 shows characteristic 2Θ peaks. Thus, the XRD curve may be used to identify phase and purity of the spheniscidite. A single-phase and high purity spheniscidite is required to produce the final LFP product as outlined in the present disclosure below.

The LFP active material for use as a cathode in a battery may be obtained by reacting a high purity spheniscidite, for example synthesized as outlined above in method 400, with a lithium source. The spheniscidite may be the primary or sole iron phosphate source during the synthesis of the LFP active material. The synthesis may further include a dopant and carbon source.

In one embodiment, the high purity spheniscidite may be the primary or sole source of iron phosphate.

In some embodiments, the lithium source may be selected from $Li_2CO_3$, $Li_2O$, LiOH, LiF, LiI or mixtures thereof. In one example, the lithium source may be $Li_2CO_3$.

In some embodiments, the dopant, M, may be selected from V, Nb, Ti, Al Mn, Co, Ni, Mg, Zr, oxides thereof, or mixtures thereof. The dopant may be added in amounts up to 10 mol %. In one example, the dopant may be present at an amount less than 5 mol %.

In some embodiments, the carbon source may be selected from PVB, citric Acid, sugar, PVA, glycerol or mixtures thereof.

Figure 7:
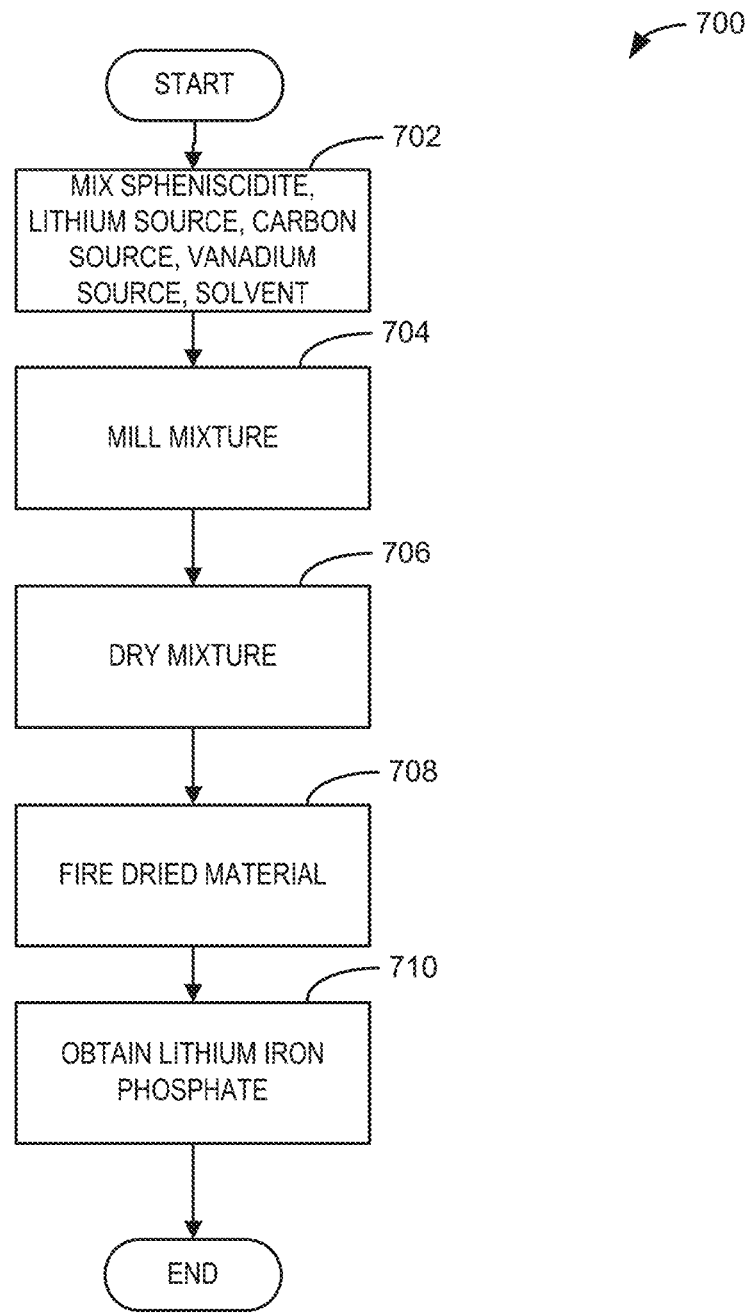
FIG. 7 illustrates an example method for synthesizing LFP from spheniscidite.

Turning to FIG. 7, an example method 700 is outlined for the synthesis of LFP from spheniscidite. The final LFP material may be formed by combining a lithium source and the spheniscidite by mixing, milling, and chemical reduction with a temperature programmed reaction (TPR) under $N_2$. The resulting LFP active material may then be useable in a cathode of an electrochemical cell.

At 702, the method may include mixing spheniscidite, a lithium source, a dopant, a carbon source, and a solvent to form a slurry. In one example, the solvent may include an alcohol. In another example, the solvent may include water. Thus, the method may include an alcohol or water slurry. The dopant and carbon source may vary based on the solvent choice. In some examples, more than one carbon source may be included.

In one specific example of reaction (2), the lithium source and spheniscidite may be mixed with a dopant and a carbon source in an IPA slurry. The slurry may then be milled.

At 704, the method may include milling the mixture of 702. The method may include milling for a minimum amount of time.

At 706, the method may include drying the milled mixture of 704. The mixture may be dried using a variety of methods known to the industry.

At 708, the method may include firing the dried material of 706. The material may be fired to convert the material to $LiFePO_4$, LFP, by a temperature programmed reaction (TPR). The TPR may be run in an inert atmosphere, for example $N_2$. For example, the dried powder may be converted to $LiFePO_4$ by TPR in $N_2$ flow in a tube furnace. The TPR profile may include ramping from room temperature and then heating. The TPR may further include programmed holds at specific temperatures.

At 710, the method may obtain the lithium iron phosphate, LFP. The resulting LFP active materials have a crystalline structure, as illustrated by the XRD pattern provided in FIG. 8. In addition, the size of the primary particles, shown in FIGS. 2A and 2B, may be between 20 nm to 80 nm, leading to a higher surface area in a range of 25 $m^2/g$ to 35 $m^2/g$ final LFP active materials, shown in FIGS. 3A and 3B. The use of an alcohol slurry or water slurry results in a similar primary particle size in the LFP, as illustrated in FIGS. 2A and 2B. As used herein, a similar size may be within 5% of one another, for example by surface area and/or volume. The secondary particle of the LFP differs based on the solvent slurry. The alcohol slurry secondary particle shape is shown in FIG. 3A and the water slurry secondary particle shape is shown in FIG. 3B. The alcohol slurry secondary particle shape shows a variety of shapes while the water slurry secondary shape shows spheres that are more exact.

Figure 8:
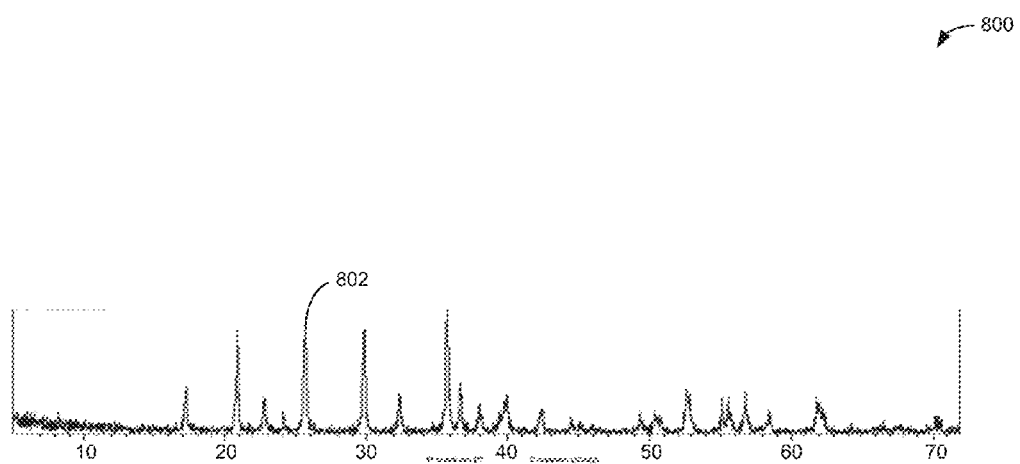
FIG. 8 shows an XRD pattern of LFP.

Turning to FIG. 8, an XRD pattern 800 of the LFP is shown. The XRD curve 802 may be used to determine the purity of the resultant LFP. The XRD curve 802 shows characteristic 2Θ peaks, indicating a pure crystalline LFP. Thus, the XRD curve may be used to identify phase and purity of the LFP. A high purity spheniscidite is required to produce the final crystalline LFP product as outlined in the present disclosure wherein the final crystalline LFP product improves battery performance at low temperatures. For example, the LFP product may improve battery performance at 0° C. or lower. In another example, the LFP product may improve battery performance at low temperatures of −20° C. down to −30° C.

A resulting LFP active material can be tested in a non-aqueous electrochemical cell. The LFP active material serves as the positive electrode against a source of lithium having a total lithium content much greater than the lithium storage capacity of the LFP electrode, such as lithium foil. This electrochemical cell construction is often referred to as a lithium half-cell by those skilled in the art of lithium-ion batteries. In such a cell, the LFP active material is formulated into an electrode, optionally using a conductive additive, such as carbon, and a polymeric binder. The LFP active material electrode is separated from the lithium metal counter electrode, optionally by a microporous polymer separator. The cell is then infused with a nonaqueous lithium-conducting liquid electrolyte. The charge and discharge rates of the electrode are sufficiently fast that the electrochemical behavior of the LFP electrode material can be tested.

As such, an LFP active material is optionally used in an electrochemical cell as a component of either a cathode or an anode, although a cathode is typical. An electrochemical cell includes an LFP active material containing electrode and a counter electrode. A counter electrode includes an anode base material. In some embodiments, an anode base material optionally includes silicon, graphitic carbon, silicon carbon composites, tin, Ge, Sb, Al, Bi, As, Li metal, lithium alloys, metal alloys, transition metal oxides, nitride materials, sulfide materials, and combinations thereof. An alloy optionally includes one or more of Mg, Fe, Co, Ni, Ti, Mo, and W.

Illustrative examples of a metal alloy for use as an anode base material include silicon alloys. A silicon alloy is optionally and alloy of silicon and Ge, Be, Ag, Al, Au, Cd, Ga, In, Sb, Sn, Zn, or combinations thereof. The ratio of the alloying metal(s) to silicon is optionally 5% to 2000% by weight, optionally 5% to 500% by weight, optionally 20% to 60% by weight, based on silicon.

In some embodiments, an anode base material includes a lithium alloy. A lithium alloy optionally includes any metal or alloy that alloys with lithium, illustratively including Al, Si, Sn, Ag, Bi, Mg, Zn, In, Ge, Pb, Pd, Pt, Sb, Ti, tin alloys, and silicon alloys.

Additional examples of alloys and methods of alloy production can be found in U.S. Pat. No. 6,235,427, herein incorporated by reference for all purposes. In some embodiments, the anode base material is or includes: silicon; carbon and graphitic carbon materials such as natural graphite, graphene, artificial graphite, expanded graphite, carbon fibers, hard carbon, carbon black, carbon nanotubes, fullerenes and activated carbon; a composite material of a metal or metal compound and a carbon or graphite material whereby a metal optionally includes lithium and silicon; and a lithium-containing nitride. As such, the anode base material, also referred to here as the negative electrode, may include non-graphitizable carbon, artificial graphite, and natural graphite combinations of carbonaceous materials with silicon or silicon oxide.

Optionally, an electrode base material is not graphite alone in the absence of silicon, lithium, or a metal. In some embodiments, an anode base material is a composite material of silicon and graphitic carbon that may or may not include a carbon coating and or thermal treatment to stabilize the adhesion of the coating to the surface. In some embodiments, an anode base material includes a coating, illustratively a carbon coating.

An anode base material or an LFP active material may or may not be associated with a conductive substrate. When associated with a substrate, the substrate is optionally formed of any suitable electronically conductive and impermeable or substantially impermeable material, including, but not limited to, copper, stainless steel, titanium, or carbon papers/films, a nonperforated metal foil, aluminum foil, cladding material including nickel and aluminum, cladding material including copper and aluminum, nickel plated steel, nickel plated copper, nickel plated aluminum, gold, silver, any other suitable electronically conductive and impermeable material or any suitable combination thereof. In some embodiments, substrates may be formed of one or more suitable metals or combination of metals (e.g., alloys, solid solutions, plated metals). Optionally, an anode base material or LFP active material is not associated with a substrate.

In some embodiments, the inventive LFP active material may be used in an electrode for a secondary battery. An electrode is optionally fabricated by suspending a LFP active material and a binder (optionally at 1-10% by weight of solvent) in a solvent to prepare a slurry, and applying the resulting slurry to a current collector, followed by drying and optionally pressing. Exemplary binders include PVDF binder solutions in NMP or aqueous polyolefin latex suspensions. Examples of the solvent used in preparation of the electrode may include, but are not limited to carbonate-based, ester-based, ether-based, ketone-based, alcohol-based, or aprotic solvents. Specific organic solvents such as dimethyl sulfoxide (DMSO), N-methyl pyrrolidone (NMP) and ethylene glycol, and distilled water may be used. Such solvents are known in the art.

An electrochemical cell is also provided that uses an electrode formed of an LFP active material substantially as provided by the application with embodiments as described herein. The electrochemical cells optionally employ a porous electronically insulating separator between the positive and negative electrode materials, and a liquid, gel or solid polymer electrolyte. The electrochemical cells optionally have electrode formulations and physical designs and constructions that are developed through methods well-known to those skilled in the art to provide low cell impedance, so that the high power capability of the LFP active material may be utilized.

Optionally, the LFP active materials described herein typically contain less than about 5 weight percent, or about 3 weight percent, of any additional phase that does not substantially store ions, but may provide added electrical conductivity. Such additional phases include, for example, carbon, a metal, or an intermetallic phase, such as a metal phosphide, metal carbide, metal nitride, or mixed intermetallic compound, such as metal carbide-nitride or metal carbide-phosphide. The electrode materials may include an amount of carbon in the range of 2.1% to 2.5%. In some examples, the primary and secondary particles of the LFP may have a carbon percentage of about 2.3%.

In certain embodiments, for use as a storage electrode, the LFP active material typically is formulated into an electrode by standard methods, including the addition of a few weight percent of a polymeric binder, and less than about 10 weight percent of a conductive additive, such as carbon. In at least some such embodiments, the electrodes are coated onto one or both sides of a metal foil (e.g. substrate), and optionally pressed to a coating thickness of between about 30 micrometers and about 200 micrometers. Such electrodes can be used as the positive or negative electrode in a storage battery. Their performance can be evaluated, for example, using laboratory cells of the coin-cell or so-called Swagelok cell types, in which a single layer of electrode is tested against a counter electrode (typically lithium metal when the nanoscale material is a lithium storage material) using galvanostatic (constant current) or potentiostatic (constant voltage) tests or some combination of the two. Under galvanostatic conditions, the current rate can be described as "C-rate," in which the rate is C/h, and n is the number of hours required for substantially complete charge or discharge of the cell between a selected upper and lower voltage limit.

An electrochemical cell includes an electrolyte. An electrolyte is optionally a solid or fluid electrolyte. Illustratively, the electrolyte includes a lithium salt and a non-aqueous organic solvent. A lithium salt is optionally $LiPF_6$, $LiBF_4$, $LiSbF_6$, $LiAsF_6$, $LiN(SO_2C_2F_5)_2$, $Li(CF_3SO_2)_2N$, LiFSI, LiTFSI, $LiN(SO_3C_2F_5)_2$, $LiC_4F_9SO_3$, $LiClO_4$, $LiAlO_2$, $LiAlCl_4$, LiCl, LiI, or $LiB(C_2O_4)_2$ (lithium bis(oxalato) borate; LiBOB). The lithium salt is optionally present in a concentration ranging from about 0.1 M to about 2.0 M. When the lithium salt is included at the above concentration range, an electrolyte may have excellent performance and lithium ion mobility due to optimal electrolyte conductivity and viscosity.

Thus, as described above, in some examples, a method, is provided including introducing an iron (II) salt, a phosphate source, an ammonium source, and an oxidizing agent into an aqueous solution to form a mixture. The mixture may be filtered to recover a solid by-product and then the solid by-product may be re-dispersed into an aqueous solution. The aqueous solution may be heated and then filtered to recover a solid. The solid may be dried to obtain a high purity spheniscidite with a formula of $NH_4Fe_2(PO_4)_2$ $OH*2H_2O$. The high purity spheniscidite may be a single-phase.

In some examples, the iron (II) salt may be selected from iron (II) sulfate, iron (II) chloride, iron (II) nitrate, any hydrate thereof, or a mixture thereof. Further, in some examples, the phosphate source may be selected from $H_3PO_4$, $P_2O_5$, $NH_4H_2PO_4$, $(NH_4)_2HPO_4$, $(NH_4)_3PO_4$, $NaH_2PO_4$, $Na_2HPO_4$, $Na_3PO_4$, or mixtures thereof. Moreover, in some examples, the ammonium source may be selected from $NH_4H_2PO_4$, $(NH_4)_2HPO_4$, $(NH_4)_3PO_4$, $NH_4OH$ or mixtures thereof. The oxidizing agent also may be selected from $H_2O_2$, $Na_2O$, $NaClO_3$, or mixtures thereof.

As another example, the method may further include mixing the obtained high purity sphenisicidite, a lithium source, a dopant, and a carbon source, adding a solvent to produce a slurry, milling the slurry, drying the milled slurry, and firing the dried milled slurry to obtain the lithium iron phosphate, wherein the lithium iron phosphate comprises a substantially olivine crystalline phase, a primary particle in the range of 20 nm to 80 nm, a secondary particle with a d50 in the range of 5 μm to 13 μm, and a surface area of 25 $m^2/g$ to 35 $m^2/g$, a carbon percentage of about 2.3%. The lithium iron phosphate may be substantially in an olivine crystalline phase where there may be less than 5 weight percent of any additional phases which do not substantially store ions. The lithium iron phosphate may improve battery performance at low temperatures in comparison to current lithium iron phosphate materials. For example, the current lithium iron phosphate materials may be stoichiometric lithium iron phosphate materials, wherein the elements are present in the ratios prescribed by the formula $LiFePO_4$.

In some examples, with milling, primary particles may be obtained of about 20 nm to about 80 nm. It should be appreciated that the method may include a solvent where the solvent is water and/or a compound including an alcohol functional group.

In one example, a lithium iron phosphate (LFP) is provided comprising crystalline primary particles and secondary particles, wherein the primary particles are formed from a plate-shaped single-phase ammonium iron phosphate sphenisicidite precursor and a lithium source. The LFP, herein also referred to as a sphenisicidite-derived LFP, may be formed from the sphenisicidite precursor and show a specific LFP phase behavior. The sphenisicidite-derived LFP may exhibit different phase behavior than a conventional LFP, even when the conventional LFP has similar characteristics (for example primary particle size, specific surface area, or similar XRD peak broadening).

Figure 29:
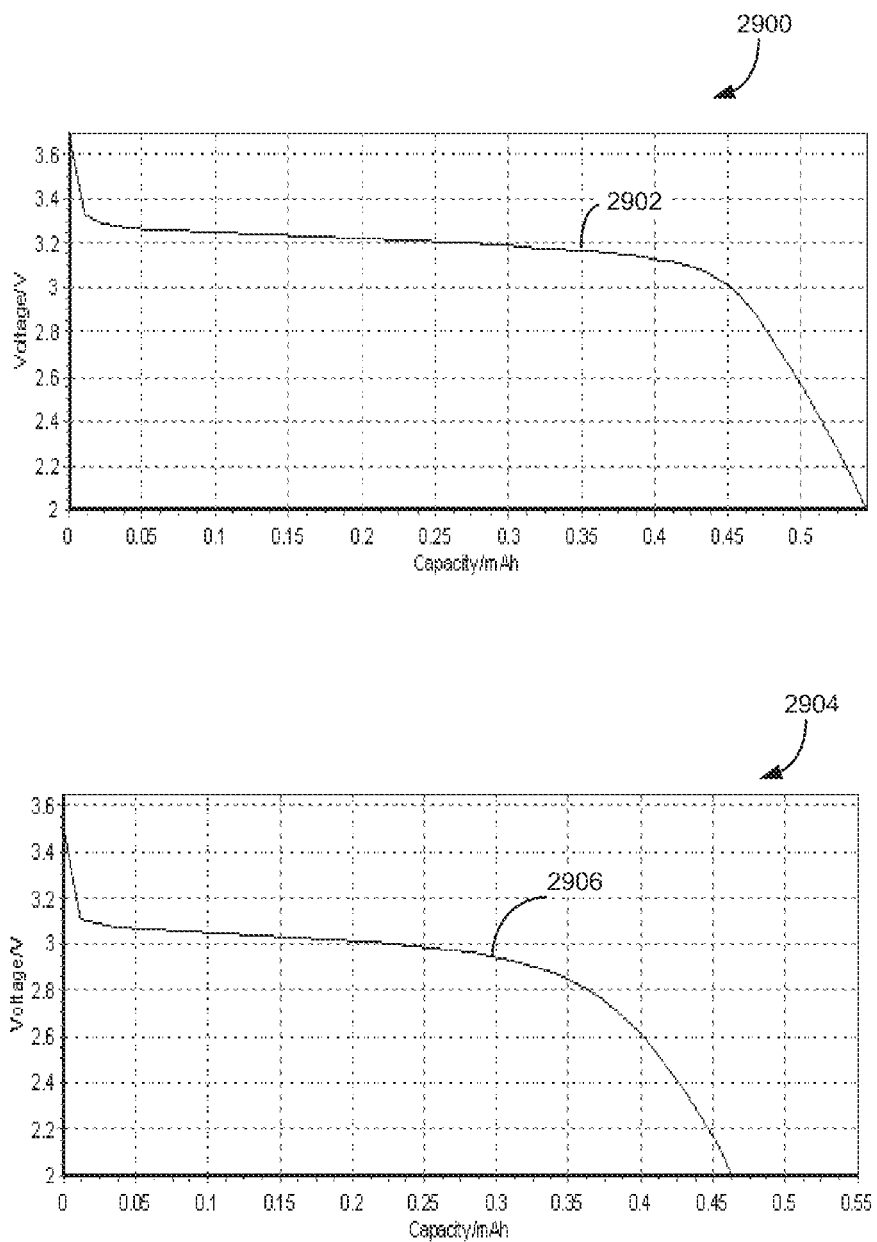
FIG. 29 is an example schematic phase diagram showing the LFP phase behavior.

For example, as illustrated in FIG. 29, an example phase diagram for the LFP illustrates the extended solid-solution range of the LFP in comparison to the conventional LFP of similar physical characteristics, e.g. particle size and/or specific surface area, for example an LFP of similar physical characteristics but without pure ammonium iron phosphate sphenisicidite precursor. In one example, the similar characteristics may be a similar size within 5% of one another and/or within 5-10% of surface areas of one another. The LFP phase behavior may include an extended solid-solution range, which may be due to the use of the pure ammonium iron phosphate sphenisicidite precursor. The LFP phase behavior, including the extended solid-solution range of the LFP, may translate to improved battery properties, for example when used in lithium ion cells. For example, the LFP may show improved temperature performance, such as at low temperature, and improved capacity. In addition, the two-phase field may occur over a smaller range of Li concentration for the LFP at the same temperature in comparison to conventional LFP materials having similar particle sizes. This is contrary to the conventional way of thinking where the two-phase field shrinks with decreasing particle size, and has the same behavior for the same particle sizes. The LFP may also show extended solid-solution ranges in comparison to conventional LFP's of similar size over a range of temperatures.

For example, 2900 and 2904 of FIG. 29 show voltage versus discharge capacity curves at a discharge rate of 10 C (current density to discharge the full capacity of the battery device in 1/10 of an hour) for the LFP 2902, which illustrates the extended solid-solution range of the LFP, in comparison to the conventional LFP 2906. The LFP and the conventional LFP have similar physical characteristics, e.g. particle size and/or specific surface area. The similar characteristics may be a similar size within 5% of one another and/or within 5-10% of surface areas of one another. The shapes of the two discharge curves illustrate that the LFP material 2902 provides an improved battery material for high-rate applications as compared to the conventional LFP 2906. The shape of the discharge curves at the last 25% of the discharge show clear differences as the voltage begins to decrease. The LFP 2902 curve shows a sharper, defined change in slope, occurring just above 3V. The discharge curve shape of the LFP 2902 may illustrate the change in the mode of lithium intercalation within the active material particles. More specifically, illustrated by the flatter portion of the discharge curve, the LFP material may be lithiated via a two-phase reaction, where two distinct crystalline phases co-exist (i.e. the LFP phase behavior). A first phase may be present in a predominately lithiated state and a second phase may be present in a predominately unlithiated state. However, in some materials, a one-phase lithiation reaction may occur, which may also enhance faster lithium intercalation kinetics. The percentage of the total lithiation reaction occurring in a two-phase versus a one-phase lithiation reaction may control the overall rate performance of the active cathode material.

In contrast to the LFP 2902, the conventional LFP 2906 shows a distinctly different discharge voltage curve. The overall voltage of the battery employing the conventional LFP is lower in comparison to the LFP 2902. Further, the discharge curve of the conventional LFP 2906 is more curved and continuously rounded, especially during the last 25% of the discharge. The conventional LFP 2906 does not show a sharp transition between the two nearly linear sloping regions. The characteristics of the conventional LFP 2906 show a material with higher overall net impedance. The impedance may limit a battery from completely discharging all its capacity, as illustrated by the shorter capacity at the end of discharge at 2V for the conventional LFP 2906. The smoothly sloping nature of the discharge curve of the conventional LFP 2906 does not illustrate a clear transition from a two-phase to a single phase lithiation reaction, as is seen the LFP 2902. For example, high resolution X-ray diffraction of the LFP and the conventional LFP at various states of discharge would illustrate the differences in the phase behavior and the lithiation mechanism. FIG. 29 illustrates that the LFP 2902, prepared from pure ammonium iron phosphate sphenisicidite precursor, has an improved rate performance in comparison to the conventional LFP 2906. Further, the LFP may be concluded to have a mode of lithiation, more specifically a phase change behavior when the LFP is sufficiently discharged, which is different from the conventional LFP. Thus, the LFP may include an LFP phase behavior.

The differences in shape of the discharge capacity curves, as described above and illustrated in 2900 and 2904 for the LFP 2902 and the conventional LFP 2906, may indicate that the LFP has less polarization than the conventional LFP. The conventional LFP 2906 discharge curve does not show a clear break in the two slope areas, indicating that the behavior may be controlled by polarization, whereas the LFP 2902 discharge curve shows a more clear break in the two slope areas, indicating that the behavior has less polarization. For example, polarization in an electrochemical process may lower the efficiency of the process. The lower polarization and clear breaks in the two-slope areas may indicate the presence of a wider solid-solution range in the spheniscidite-derived LFP.

In one embodiment, the LFP phase behavior may exhibit characteristics such as an extended solid-solution range. For example, the spheniscidite-derived LFP may possess different phase behavior from standard materials, including, but not limited to, extended solid-solution ranges at the same temperature and particle size. The extended solid-solution range in the LFP may be greater at the same temperature and particle size in comparison to current LFP materials. As yet another example, the lithium iron phosphate may exhibit an LFP phase behavior wherein the LFP phase behavior includes, as a non-limiting example, an extended solid solution range where x in $Li_xFePO_4$ exceeds 0.2 at Li-poor compositions, and is less than 0.8 at Li-rich compositions, at 45° C. for a primary particle size of 20 nm-80 nm. In yet another non-limiting example, an extended solid solution range where x in $Li_xFePO_4$ exceeds 0.1 at Li-poor compositions, and is less than 0.15 at Li-rich compositions, at 0° C. for a primary particle size of 20 nm-80 nm may be seen for the LFP.

In a non-limiting example, the LFP phase behavior may provide extended solid-solutions in a wider range of lithium compositions over which a solid-solution occurs. For example, in some embodiments, the LFP phase behavior may be such that the difference in the solid-solution ranges is a wider range of Li composition over which a solid solution occurs at low or at high states of charge (or high and low overall Li concentration).

The modifications of the LFP phase behavior may provide for improved battery performance at a variety of temperatures, for example low temperatures, and improved capacity in comparison to current lithium iron phosphate materials. Thus, the use of the pure ammonium iron phosphate spheniscidite precursor may be to provide a precursor material which introduces an LFP phase behavior into the synthesized lithium iron phosphate material, resulting in improved performance in battery applications. Specifically, for example, the modified LFP phase behavior may result in extended solid-solution ranges in the lithium iron phosphate. This LFP phase behavior is an unexpected result when compared to other LFP materials having similar specific surface area, particle size, or exhibiting similar x-ray diffraction peak broadening. This is at least partially due to the fact that spheniscidite-derived LFP exhibits different phase behavior in comparison to a conventional LFP material of the same BET specific surface area (or primary particle size, or exhibiting the same X-ray peak broadening).

In a non-limiting example, the markedly superior power at low temperature of battery cells having the spheniscidite-derived LFP may be obtained despite this material having a lower BET specific surface area and less X-ray peak broadening. Therefore, in this example, larger LFP primary crystallite size does not result in an inferior performance, due to the LFP phase behavior.

Further, the LFP phase behavior and improved performance characteristics appear not to be due to a shorter diffusion distance at the crystallite level. Also, unexpectedly, the performance may not be explained by the presence of conductive impurity phases since the amount of those phases can be widely varied with composition, heat treatment temperature, and firing atmosphere, and have not previously resulted in the exceptional low temperature behavior of the disclosed LFP.

It is also considered that olivine cathode materials may suppress the two-phase immiscibility field inherent to LFP and thereby avoid the first order phase transition. Published scientific literature on olivine cathode materials indicate that suppressing the two-phase immiscibility field inherent to LFP, and thereby avoiding the first-order phase transition and its associated high mechanical strain, may be responsible for obtaining high power. Without being bound by any particular scientific interpretation, the range of Li concentration over which immiscible solid phases of differing Li concentration appear, at any given temperature, may be decreased by creating defects and atomic disorder. Further, since the immiscibility field in pure $LixFePO_4$ is relatively symmetric in composition space between Li concentrations of zero and one, the effects of diminished immiscibility may generally be seen at low and high Li concentrations, corresponding to high and low states of charge of the corresponding battery cell.

As a comparative example, in undoped nanoparticulate LFP, it has been found that the extent of solid solution at low overall Li concentrations is lower than 20% at an equivalent spherical particle size obtained from the BET specific surface area of 34 nm, is lower than 10% at a particle size of 42 nm, and is lower than 5% at a particle size of 100 nm. In contrast to the comparative LFP examples, the unexpected LFP phase behavior of the spheniscidite-derived material has an increased extended solid-solution range at the same temperature and particle size in contrast to prior LFP materials.

As a non limiting example, the LFP phase behavior of the spheniscidite-derived material may include a lithium amount in solid solution that is greater than or less than 20% of a stoichiometric lithium iron phosphate of the same particle size. In another example, the phase behavior includes a lithium amount in solid solution that is greater than or less than 5% of a stoichiometric lithium iron phosphate of the same particle size. The lithium iron phosphate may show a lithium nonstoichiometry, i.e. an extended solid-solution range. The lithium iron phosphate extended solid-solution allows for the crystalline structure, in which lithium may be delithiated or lithiated, to remain the same. Thus, the LFP phase behavior of the LFP shows a homogeneous solid that may exist over a wider range of lithiation and delithiation (i.e. lithium amount) in comparison to conventional LFP material not synthesized using a pure ammonium iron phosphate spheniscidite precursor. The LFP phase behavior of the LFP shows an unexpectedly wide range where the solid-solution exists as compared with the conventional LFP's sharing similar physical characteristics.

As another example, the phase behavior may show a two-phase field wherein x may be 0.2<x<0.8 for $Li_xFePO_4$ at a temperature of about 45° C. and the extended solid-solution range occurs outside of the two-phase field range.

In some embodiments, the spheniscidite-derived LFP may include one or more structural differences from prior LFPs. These structural differences may include subtle morphology differences or differences in crystal lattice dimensions, which may produce differences in lattice strain at high and low lithium occupancy. Such structural differences may enable an unexpected and dramatic difference in lithiation, such as where the overall crystallite/grain dimensions and resulting lithium diffusion lengths are similar. The mechanistic and possibly structural differentiation of the disclosed LFP material may result in startling and dramatic difference in rate performance.

As another example embodiment, the spheniscidite-derived LFP further provides an improvement in the rate of lithium insertion/extraction. As a non-limiting example, the LFP phase behavior of the spheniscidite-derived material may result in the rate of lithium insertion/extraction being improved, e.g. at a rate of 20 C, 90% discharge capacity is retained compared to C/10. Despite having similar crystalline dimensions of 20-80 nm of the LFP, a comparative material is capable of only 80% discharge capacity at 20 C being retained.

Further, impurities may be present on the M1 site in an olivine lithium iron phosphate, where the M1 site is the lithium site in the olivine structure. Minimizing the amount of impurities on the M1 site may impove battery performance, such as with the disclosed LFP. For example, the spheniscidite-derived LFP may minimize the amount of non-lithium atoms, i.e. impurities, on the M1 site in comparison to LFPs not synthesized using spheniscidite. In one example, the impurities on the M1 site may be less than about 5%. In another example, the impurities on the M1 site may be less than about 1% of the sites.

In order to further support the disclosure, various aspects of the present application are illustrated by the following non-limiting examples. The examples are for illustrative purposes and are not a limitation on any practice of the present application. Reagents illustrated herein are commercially available, and a person of ordinary skill in the art readily understands where such reagents may be obtained.

Experimental

A spheniscidite material is formed as per reaction 1 wherein the method may include the ferrous ion, $Fe^{2+}$, oxidized to the ferric ion, $Fe^{3+}$, to form spheniscidite. The resulting spheniscidite has the following properties listed in Table 1:

In one example, a conductive additive may be added to the spheniscidite along with a metal oxide dopant, and a carbon additive. The mixture may be mixed with a solvent, for example, an alcohol based solvent to form a slurry. The slurry may then be milled. The milled slurry may then be dried and sieved. The dried powder may be fired to convert the material into the final LFP product.

In another example, a conductive additive may be added to the spheniscidite, along with a metal salt dopant, at least one carbon additive, followed by mixing in a water solvent slurry. In some examples, more than one carbon additive may be used. The slurry may then be milled. The milled slurry may then be dried. The dried slurry may then be fired to convert the material into the final LFP product.

The resulting LFP active material is used to form a Swagelok electrode that includes 79% active material, 10% carbon, and 11% binder mass ratio to make a loading of 0.45-0.49 mAhr/cm². The Swagelok half-cells are charged at C/2 to 3.8V CCCV and discharged with CC to 2 V with different C-rates. The discharge charge storage capacities at different C-rates were measured, and the rate-capability calculated. In some examples, the rate-capability at 10 C is greater than 130 mAh/g in a Swagelok half-cell.

Process 1

| Swagelok | FCC | C/5 | 10 C |
|---|---|---|---|
| Energy (RT) | 488.9 | 516.0 | 441.1 |
| Energy (0° C.) | 486.8 | 497.1 | 318.8 |

TABLE 1

| Morphology | $NH_4$:P ratio | $NH_4OH$ (g) | pH $1^{st}$ step | pH $2^{nd}$ step | P/Fe | Color | Texture | FCC | C/5 | 10C | C % | N % | BET |
|---|---|---|---|---|---|---|---|---|---|---|---|---|---|
| Spheniscidite/trace Phosphosiderite | 2.014 | 15.00 | 2.96 | 2.04 | 1.2 | Yellow | Soft | 154 | 163 | 149 | 2.67 | 0.30 | 30.8 |
| Spheniscidite | 2.137 | 22.58 | 3.09 | 2.20 | 1.02 | Yellow | Soft | 158 | 169 | 154 | 2.48 | 0.20 | 29.8 |

The various spheniscidite materials are tested by ICP-AES with the following results listed in Table 2:

TABLE 2

| | | Synthesis | | ICP Results of Product | | | | |
|---|---|---|---|---|---|---|---|---|
| Morphology | Description | pH $1^{st}$ step | pH $2^{nd}$ step | Fe-wt % | P | P/Fe | Na-wt % | S-wt % |
| Spheniscidite | 0.373 mol $NH_4^+$ in DAP (2.14 ml ratio $NH_4$:$PO_4$), age 2/3 t = 2 hr, 10 min filter (yellow) | 3.09 | 2.20 | 29.2 | 16.44 | 1.02 | 0.002 | 0.271 |
| Spheniscidite + phosphosiderite (trace) | 0.250 mol $NH_4^+$ in DAP (2.01 mol ratio $NH_4$:$PO_4$), age 2/3 t = 2 hr, 10 min filter (yellow) | 2.96 | 2.04 | 29.03 | 16.42 | 1.02 | 0.002 | 0.323 |
| Spheniscidite + phosphosiderite (trace) | 0.210 mol $NH_4^+$ in DAP (1.97 mol ratio $NH_4$:$PO_4$), age 2/3 t = 2 hr, 55 min filter (yellow) | 2.94 | 2.04 | 27.64 | 16.36 | 1.07 | 0.003 | 1.113 |

Process 2

| Swagelok | FCC | C/5 | 10 C |
|---|---|---|---|
| Energy (RT) | 502.2 | 510.3 | 437.2 |
| Energy (0° C.) | 506.8 | 488.8 | 291.8 |

Turning to FIGS. 9 through 24, the performance of an electrochemical cell comprising the LFP synthesized from pure spheniscidite is illustrated in comparison to an electrochemical cell comprising current LFP materials. The electrochemical cell comprises a cathode, an anode, an electrolyte, and a separator. As used herein, the anode, the separator, and the electrolyte in the electrochemical cell were the same for a given test.

Figure 9:
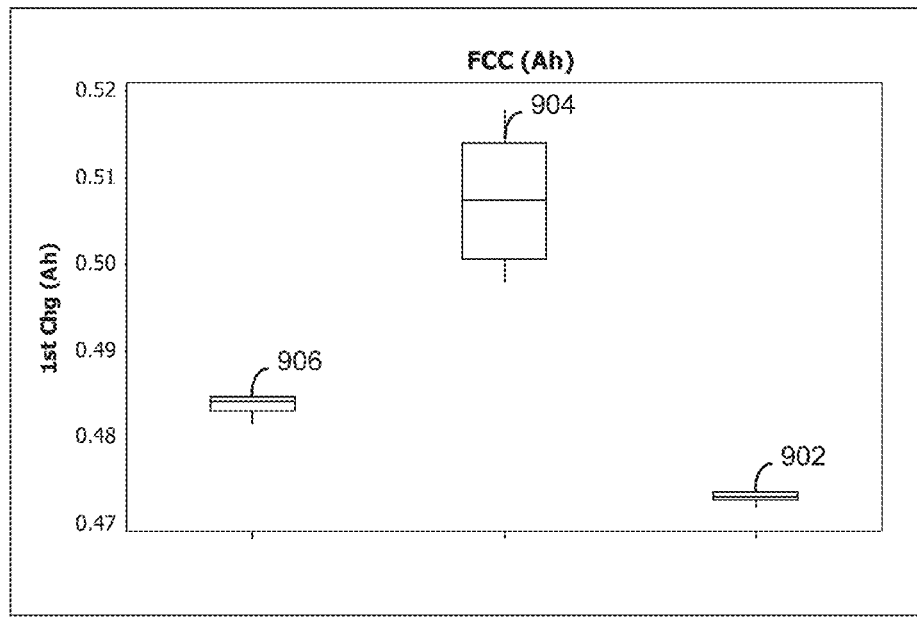
FIG. 9 shows a first charge capacity of the LFP synthesized from spheniscidite compared to current LFP materials.

Turning to FIG. 9, the first charge capacity of the LFP material used in a cathode is illustrated. The first charge capacity of the LFP 902 synthesized from pure spheniscidite is improved over current LFP materials 904 and 906 used in cathodes in Li-ion cells.

Figure 10:
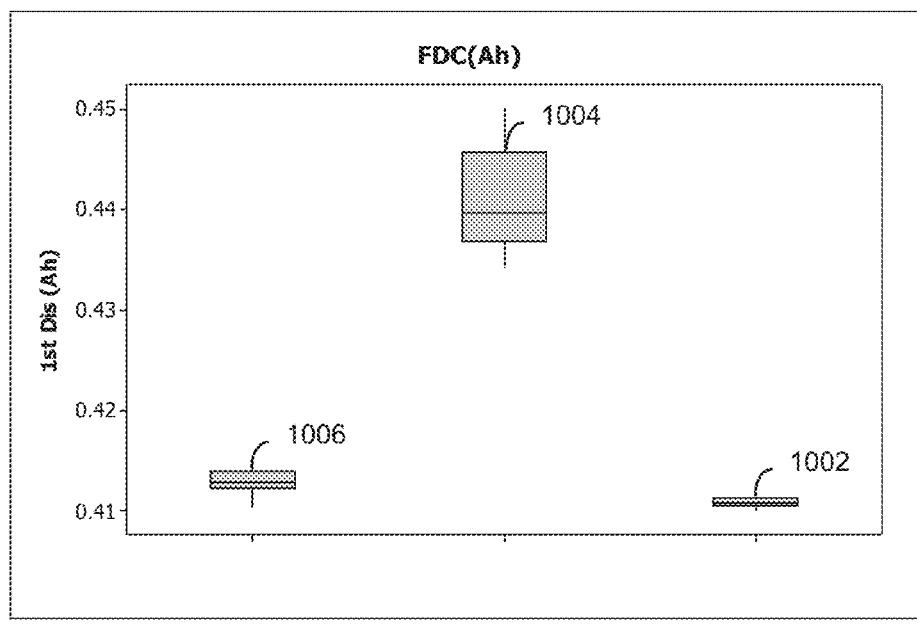
FIG. 10 shows a first discharge capacity of the LFP synthesized from spheniscidite compared to current LFP materials.

Turning to FIG. 10, the first discharge capacity of the LFP material used in a cathode is illustrated. The first discharge capacity of the LFP 1002 synthesized from pure spheniscidite is improved over current LFP materials 1004 and 1006 used in cathodes in Li-ion cells.

Figure 11:
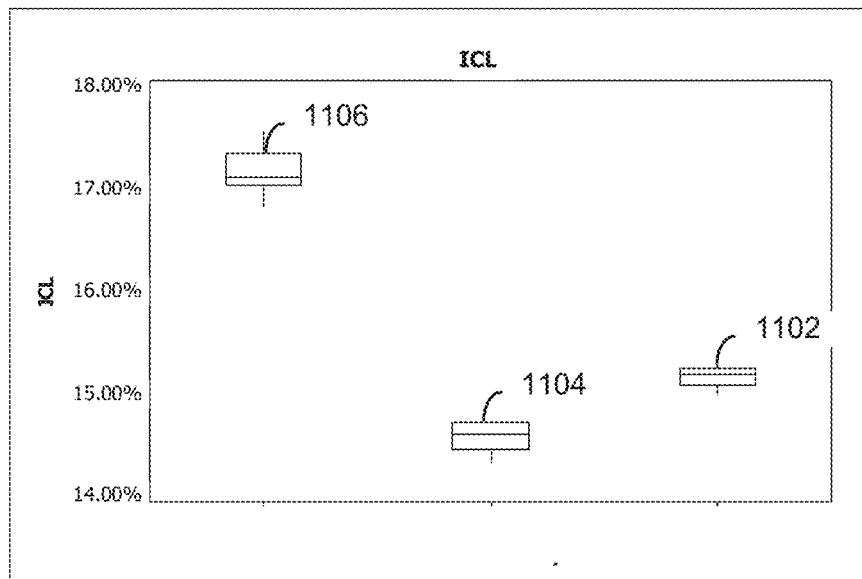
FIG. 11 shows the percentage of first charge capacity loss of the LFP synthesized from spheniscidite compared to current LFP materials.

Turning to FIG. 11, a percentage of first charge capacity of the LFP synthesized from spheniscidite is compared to current LFP materials. The LFP 1102 synthesized from spheniscidite shows percentage of first charge capacity similar to current LFP 1104 and slightly lower than current LFP 1106

Figure 12:
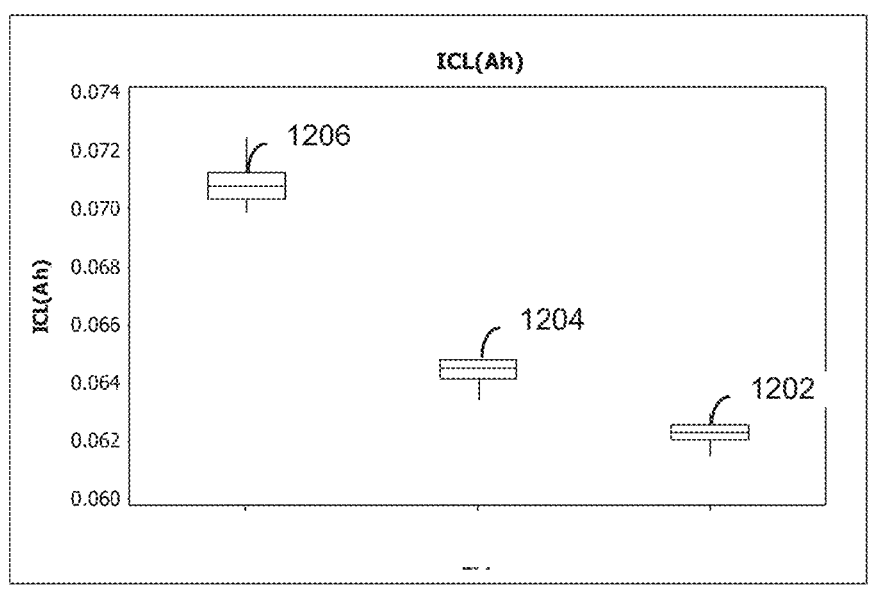
FIG. 12 shows the absolute capacity loss of the LFP synthesized from spheniscidite as compared to current LFP materials.

Turning to FIG. 12, an absolute capacity loss of the LFP synthesized from spheniscidite is compared to current LFP materials. The LFP 1202 synthesized from spheniscidite shows a lower absolute capacity loss compared to the current LFP 1204 and 1206 materials.

Figure 13:
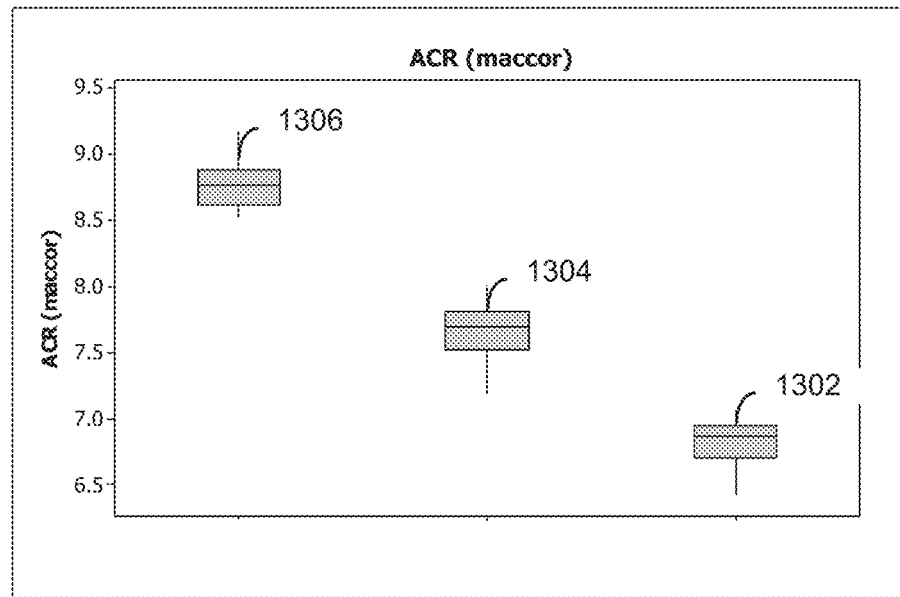
FIG. 13 shows an alternating current resistance impedance of the LFP synthesized from spheniscidite compared to current LFP materials.

Turning to FIG. 13, an alternating current resistance (ACR) impedance for cells with the LFP material used in a cathode is illustrated. Compared to the current LFP materials 1304 and 1306, the LFP 1302 synthesized from spheniscidite shows improved ACR impedance.

Figure 14:
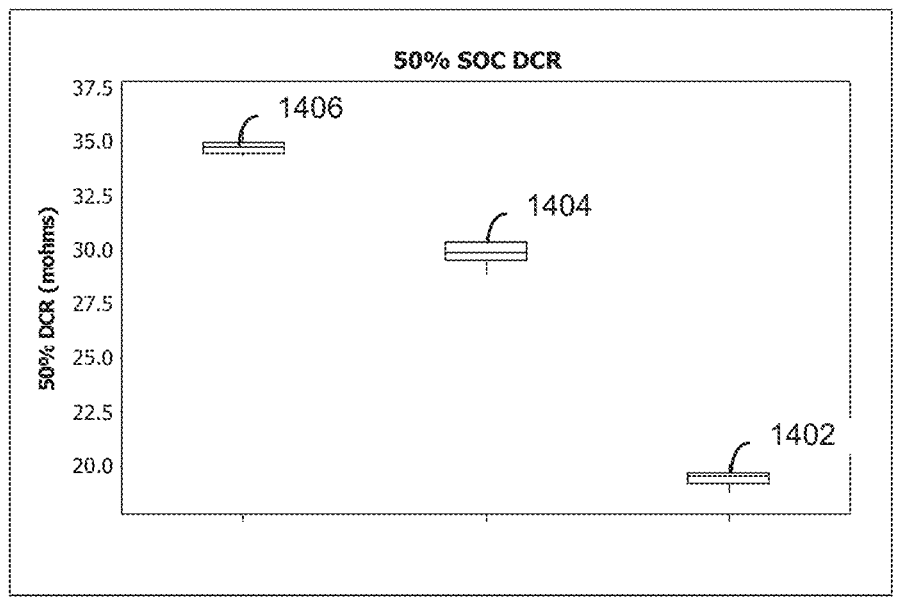
FIG. 14 shows a direct current resistance impedance of the LFP synthesized from spheniscidite compared to current LFP materials.

Turning to FIG. 14, a direct current resistance (DCR) impedance for cells with the LFP material used in a cathode is illustrated. Compared to the current LFP materials 1404 and 1406, the LFP 1402 synthesized from spheniscidite shows improved DCR impedance.

Figure 15:
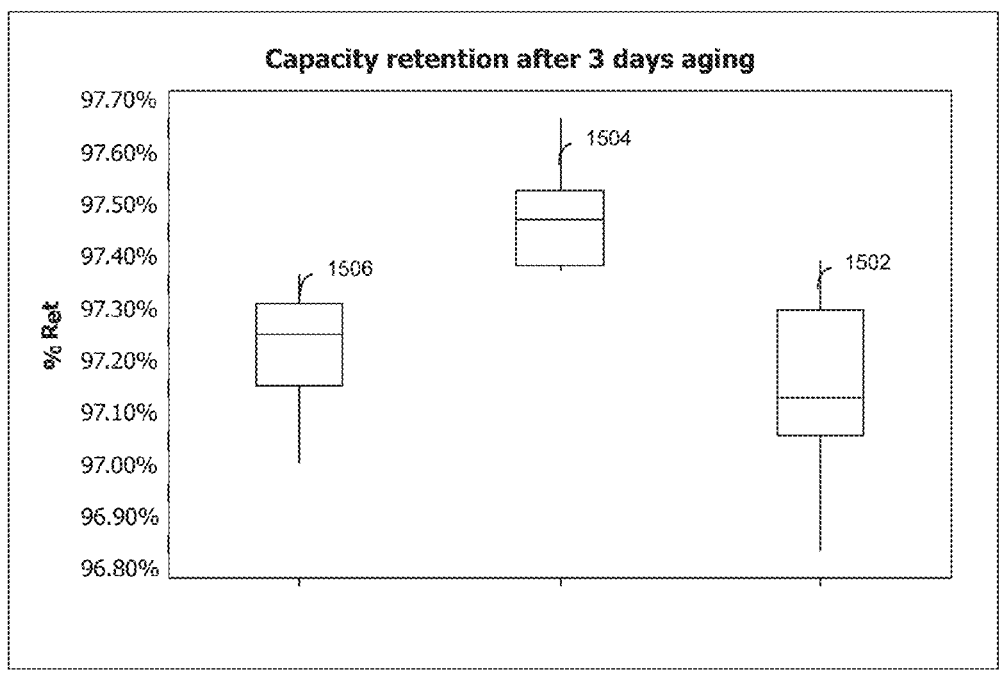
FIG. 15 shows the capacity retention after 3 days of aging of the LFP synthesized from spheniscidite compared to current LFP materials.

Turning to FIG. 15, the capacity retention after 3 days of aging is shown for the LFP material used in a cathode is illustrated. The LFP 1502 synthesized from spheniscidite shows a similar capacity retention in comparison to the current LFP materials 1504 and 1506.

Figure 16:
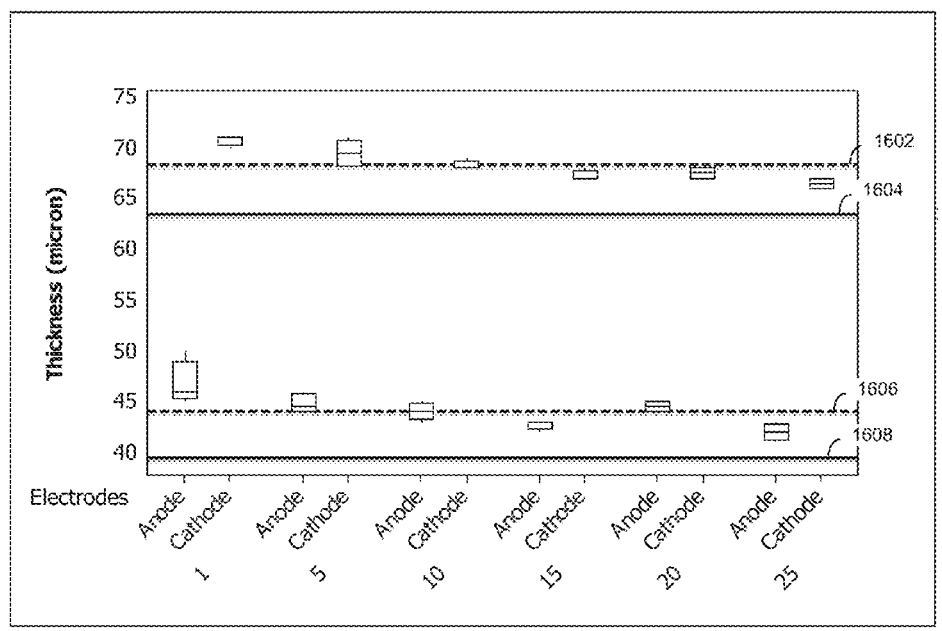
FIG. 16 shows the electrode thickness after formation.

Turning to FIG. 16, the electrode thickness after calendaring and formation is illustrated. The average cathode 1604 and anode 1608 thickness after calendering and the average cathode 1602 and anode 1606 thickness after formation show values that indicate acceptable swelling of the electrode comprising the LFP synthesized from spheniscidite.

Figure 17:
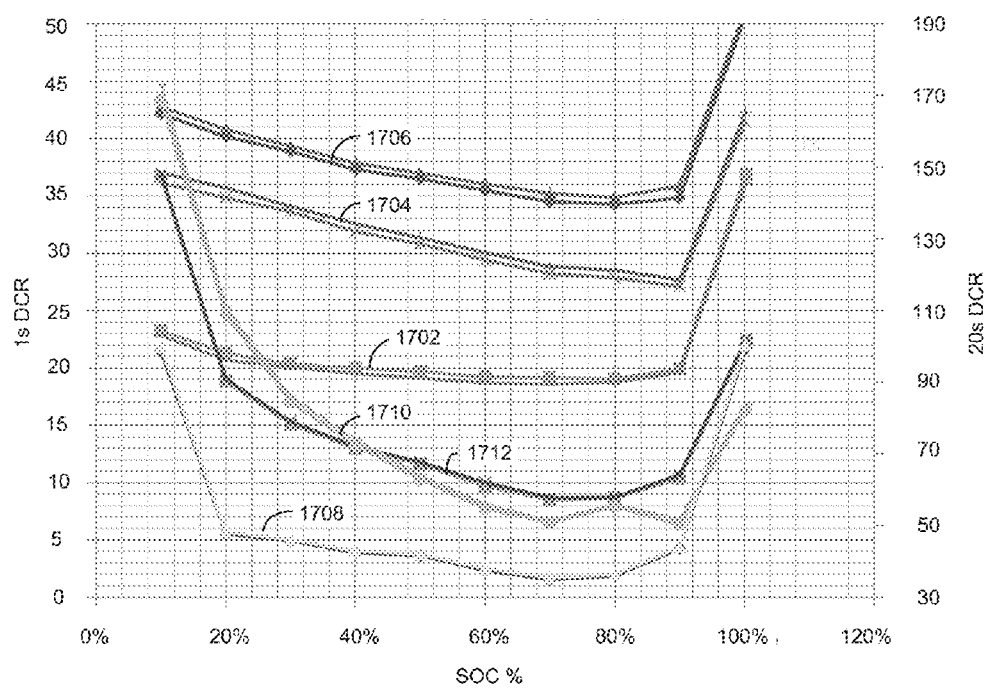
FIG. 17 shows the hybrid pulse power characterization (HPPC) data at 23° C., at 1s and 20s direct current resistance of the LFP synthesized from spheniscidite compared to current LFP materials.

Turning to FIG. 17, the hybrid pulse power characterization (HPPC) DCR impedance at 1 s and 20 s for the LFP material used in a cathode is illustrated at 23° C. The is DCR results are illustrated for the LFP 1702 synthesized from spheniscidite and the current LFP 1704 and 1706 materials and the 20s DCR results are illustrated for the LFP 1708 synthesized from spheniscidite and the current LFP 1710 and 1712 materials. The LFP 1702 and 1708 shows reduced DCR at both the 1 s and 20 s DCR.

Figure 18:
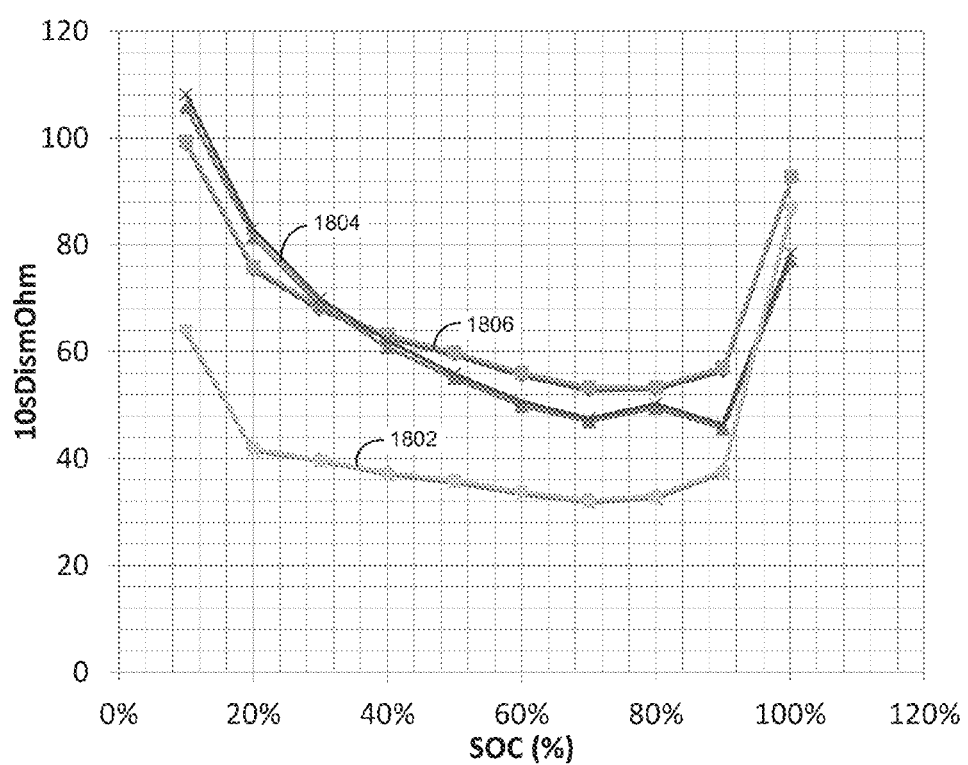
FIG. 18 shows the hybrid pulse power characterization (HPPC) data at 23° C., at 10s direct current resistance of the LFP synthesized from spheniscidite compared to current LFP materials.

Turning to FIG. 18, the hybrid pulse power characterization (HPPC) DCR impedance at 10 s of the LFP material used in a cathode is illustrated at 23° C. The 10 s DCR shows results similar to the 1 s and 20 s results illustrated in FIG. 17 above. The LFP 1802 synthesized from spheniscidite shows reduced DCR compared to the current LFP 1804 and 1806 materials.

Figure 19:
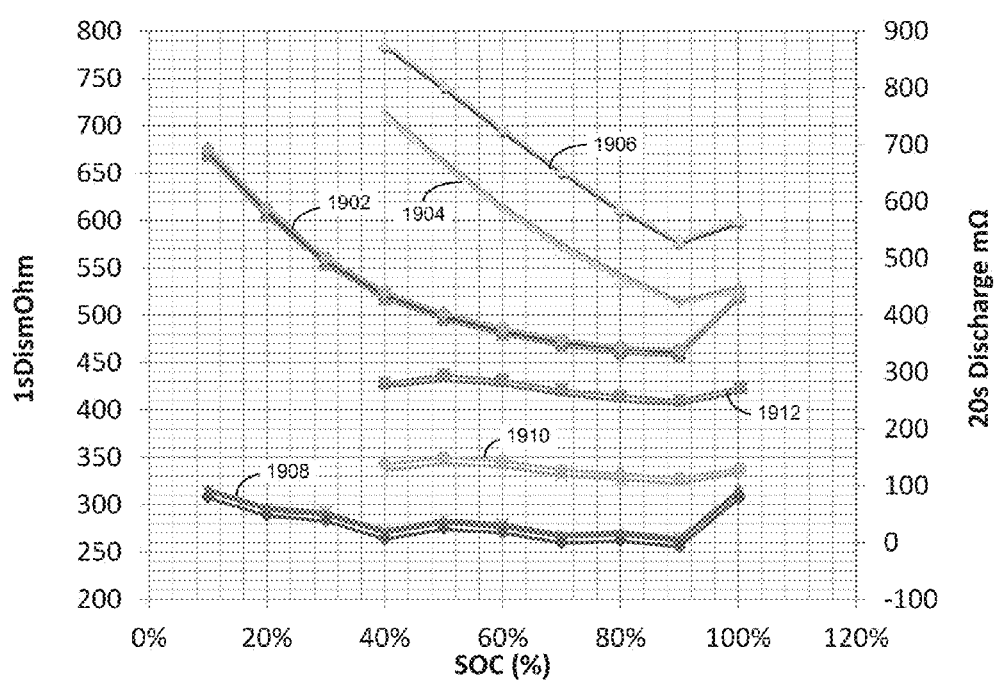
FIG. 19 shows the hybrid pulse power characterization (HPPC) data at −20° C., at 1s and 20 s pulse power for the LFP synthesized from spheniscidite compared to current LFP materials.

Turning to FIG. 19, the hybrid pulse power characterization (HPPC) at −20° C. at is and 20 s pulse power for the LFP synthesized from spheniscidite. The 1 s DCR results are illustrated for the LFP 1902 synthesized from spheniscidite and the current LFP 1904 and 1906 materials and the 20 s DCR results are illustrated for the LFP 1908 synthesized from spheniscidite and the current LFP 1910 and 1912 materials. The LFP 1902 and 1908 shows reduced DCR at both the 1 s and 20 s DCR and shows 40% improvement at 1 s and 20% improvement at 20 s at a 50% SOC at low temperature.

Thus, the disclosed electrode material, the LFP synthesized from spheniscidite, has at least a 10% improvement in direct current resistance pulse discharge at −20° C. as compared to a control electrode material not formed from the plate-shaped single-phase spheniscidite precursor wherein the electrochemical cell components are the same. As discussed previously, the electrochemical cells prepared for testing may include the same components, such as the anode, separator, electrolyte, in order to provide a comparison between the cathode electrode materials.

Figure 20:
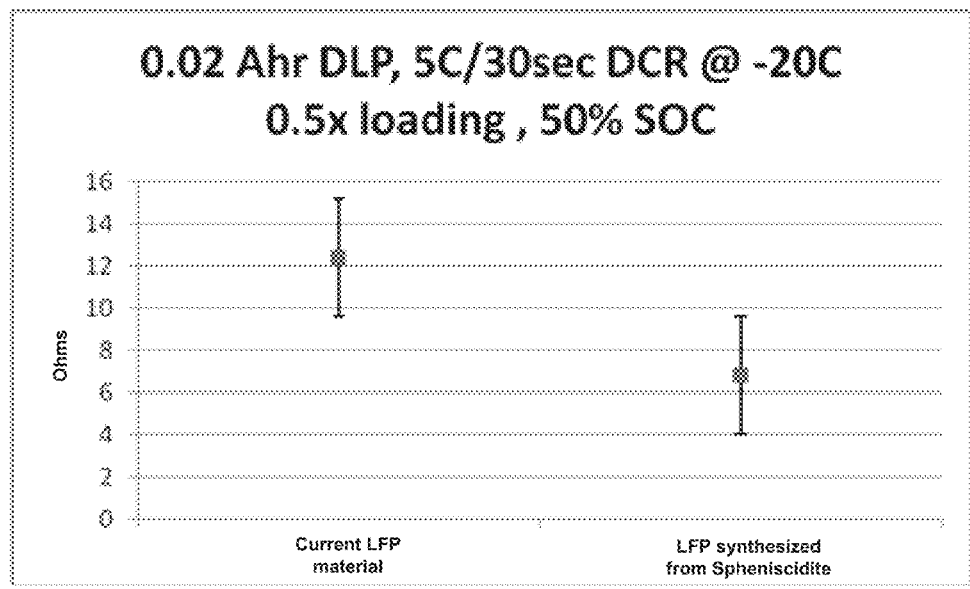
FIG. 20 shows the impedance in Double Layer Pouch (DLP) Cells at −20° C. for the LFP synthesized from spheniscidite compared to current LFP materials.

Turning to FIG. 20, the double layer pouch cell (DLP) with 0.5× electrode loading and 5 C for 30 secat 50% SOC is shown. In the particular DLP illustrated, the LFP synthesized from spheniscidite shows a 45% improvement in average DCR as compared to the current LFP material and provides less than 9 ohms impedance at 50% SOC. The LFP synthesized from spheniscidite shows improved cold temperature performance.

Figure 21:
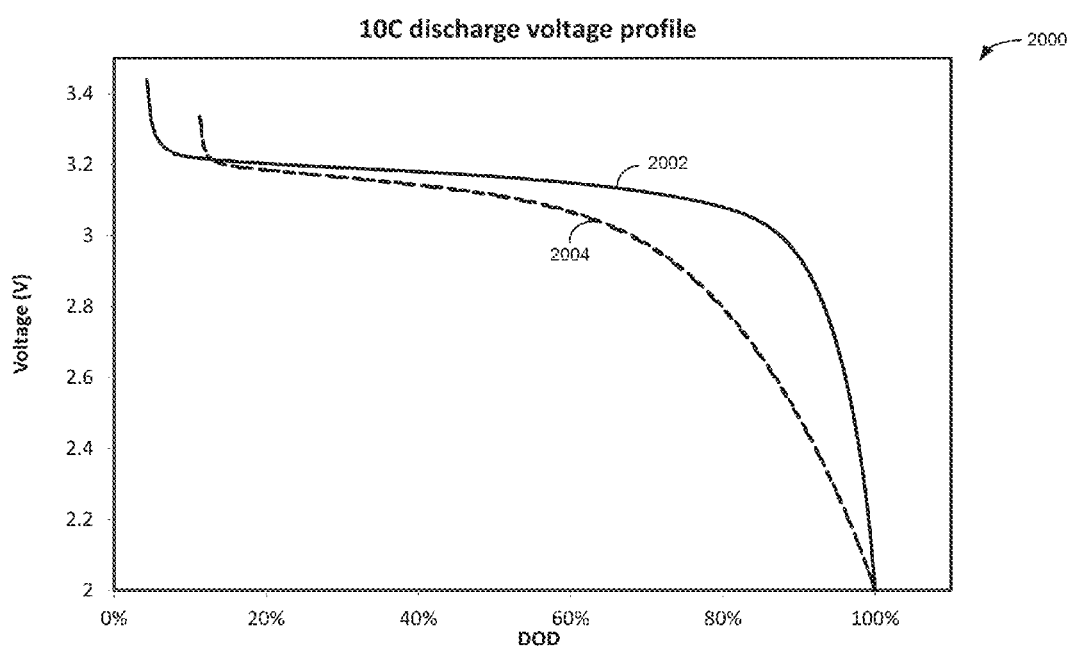
FIG. 21 shows the voltage profile at different 10 C rate discharge, for the LFP synthesized from spheniscidite compared to current LFP materials.

Turning to FIG. 21, the voltage profile for a 10 C discharge to 100% depth of discharge (DOD for the LFP synthesized from spheniscidite is shown. The voltage profile 2002 illustrates that the LFP synthesized from spheniscidite and shows an improvement in energy as compared to the current LFP 2004 material.

Figure 22:
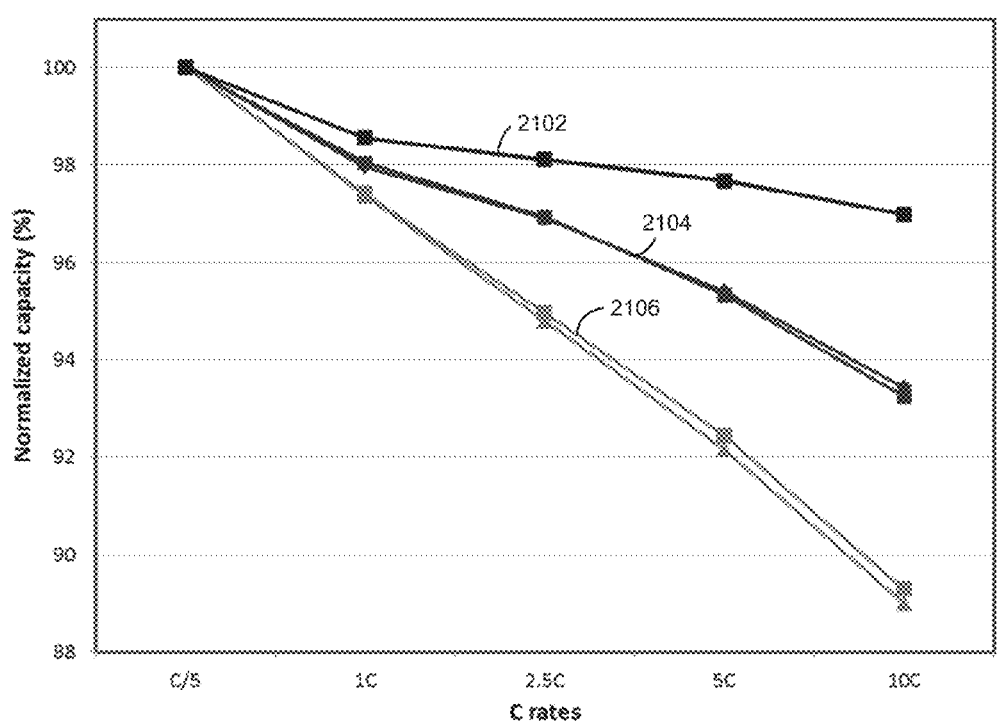
FIG. 22 shows the normalized rate capability of the LFP synthesized from spheniscidite compared to current LFP materials.

Turning to FIG. 22, the normalized rate capability at various discharge rates of the LFP synthesized from spheniscidite compared to current LFP materials is shown. The LFP 2102 shows increased rate capability compared to current LFP materials 2106 and 2104.

Figure 23:
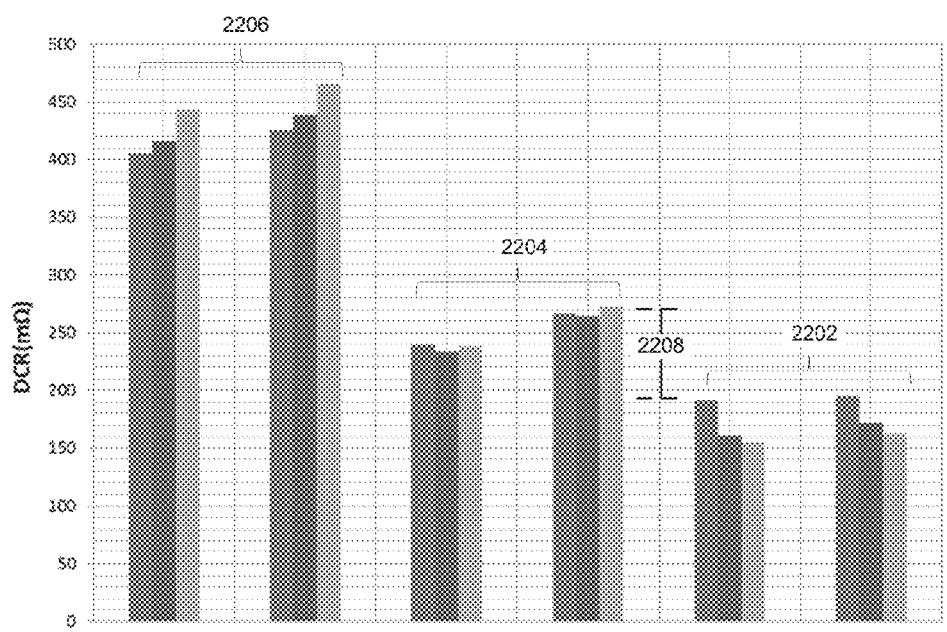
FIG. 23 shows the direct current resistance for the LFP synthesized from spheniscidite compared to current LFP materials.

Turning to FIG. 23, the direct current resistance pulse discharge at −30° C. at 10 s for the LFP synthesized from spheniscidite compared to current LFP materials is shown. The LFP 2202 synthesized from spheniscidite shows about a 20% decrease in DCR and 40% increase in power (refer to 2208) as compared to current LFP 2204 and a larger improvement over current LFP 2206.

Figure 24:
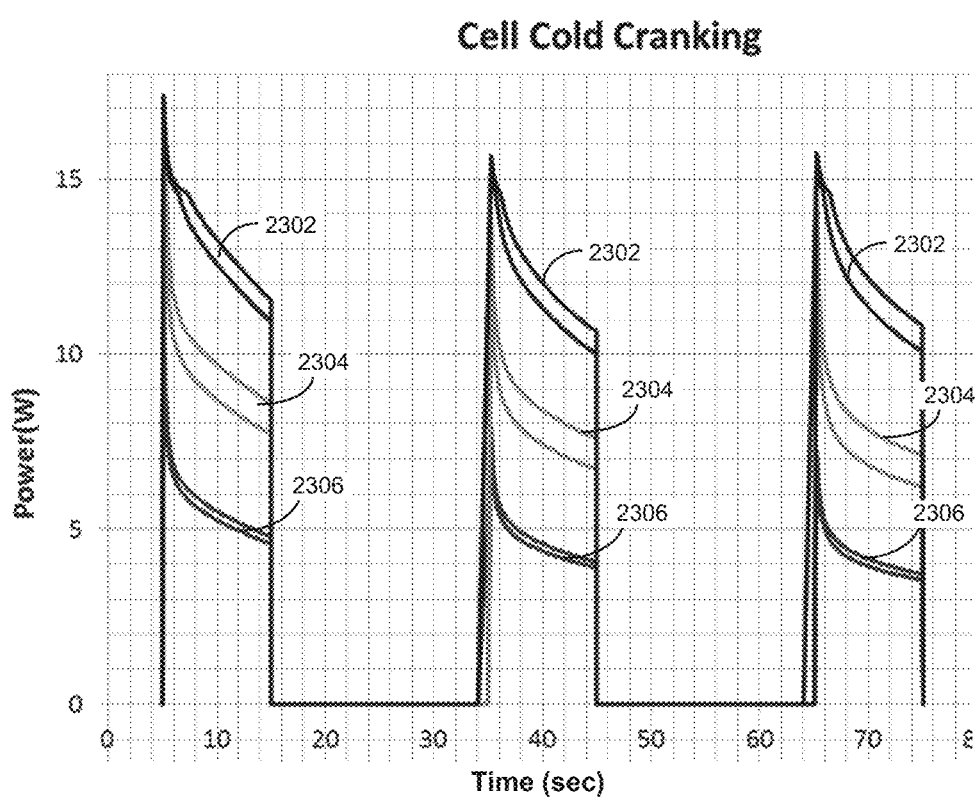
FIG. 24 shows the power resulting from a cold crank test at −30° C. for the LFP synthesized from spheniscidite compared to current LFP materials.

Turning to FIG. 24, the power resulting from a cold crank test at −30° C. over time, measured in seconds, for the LFP synthesized from spheniscidite compared to current LFP materials is shown. The LFP 2302 synthesized from spheniscidite shows increased power as compared to the current LFP 2304 and 2306 materials over time measured in seconds.

Turning to FIG. 25, the alternating current impedance for the LFP synthesized from spheniscidite compared to current LFP materials is shown. The LFP 2402 synthesized from spheniscidite shows the lowest charge transfer resistance. The current LFP 2404 and 2406 materials show higher charge transfer resistance.

The embodiments described above may be used in prismatic and cylindrical electrochemical cells. For purposes of this document, a prismatic cell is defined as a cell having a rectangular profile within a plane perpendicular to the length of the cell. Prismatic cells should be distinguished from round (cylindrical) cells that have a circular profile within this plane.

Turning to FIG. 26, an electrode assembly is illustrated which may include the disclosed LFP electro-active material. The LFP active material synthesized from spheniscidite may be present as a cathode or anode. In a stackable cell configuration, multiple cathodes and anodes may be arranged as parallel alternating layers. In the example illustrated in FIG. 25, a stackable cell electrode assembly 2500 is shown. The electrode assembly 2500 is shown to include seven cathodes 2502a-2502g and six anodes 2504a-2504f. In one example, the cathodes may comprise the LFP synthesized from spheniscidite as described above. In another example, the anodes may comprise the LFP synthesized from spheniscidite. Adjacent cathodes and anodes are separated by separator sheets 2506 to electrically insulate the adjacent electrodes while providing ionic communication between these electrodes. Each electrode may include a conductive substrate (e.g. metal foil) and one or two active material layers supported by the conductive substrate. Each negative active material layer is paired with one positive active material layer. In the example presented in FIG. 25, outer cathodes 2502a and 2502g include only one positive active material facing towards the center of assembly 2500. One having ordinary skill in the art would understand that any number of electrodes and pairing of electrodes may be used. Conductive tabs may be used to provide electronic communication between electrodes and conductive elements, for example. In some examples, each electrode in electrode assembly 2500 may have its own tab. Specifically, cathodes 2502a-2502g are shown to have positive tabs, 2510 while anodes 2504a-2504f are shown to have negative tabs.

Figure 27A:
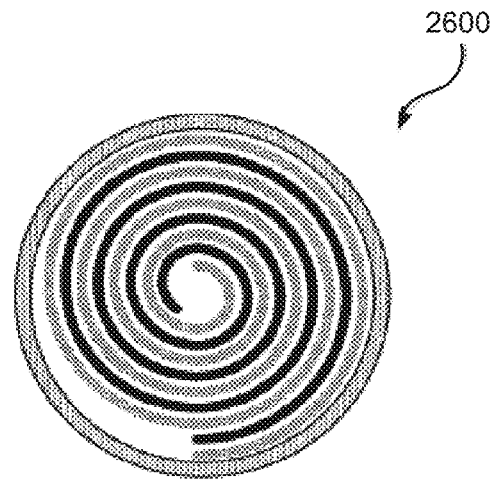
FIG. 27A shows a wound cell example.
Figure 27B:
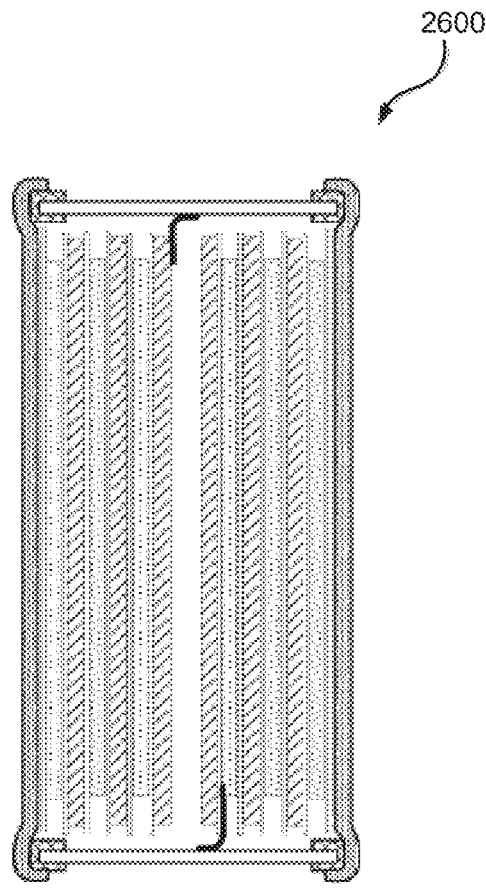
FIG. 27B shows a wound cell example.

In FIGS. 27A and 27B, a wound cell example 2600 is illustrated in which two electrodes are wound into a jelly roll and housed within a container. The container housing the negative electrode, the positive electrode, the nonaqueous electrolyte and the separator.

The LFP synthesized from pure spheniscidite having primary particles in the range of 20 nm to 80 nm and a surface area in a range of 25 m$^2$/g to 35 m$^2$/g shows improved properties when used as an electroactive material in a battery. In one example, the surface area of the LFP synthesized from pure spheniscidite may be about 30 m$^2$/g. The LFP shows reduced DCR, about 50% as illustrated in the HPPC data above, an increased power by about 40% during cold cranking, an increased rate capacity retention, and lowered charge transfer resistance.

Figure 28:
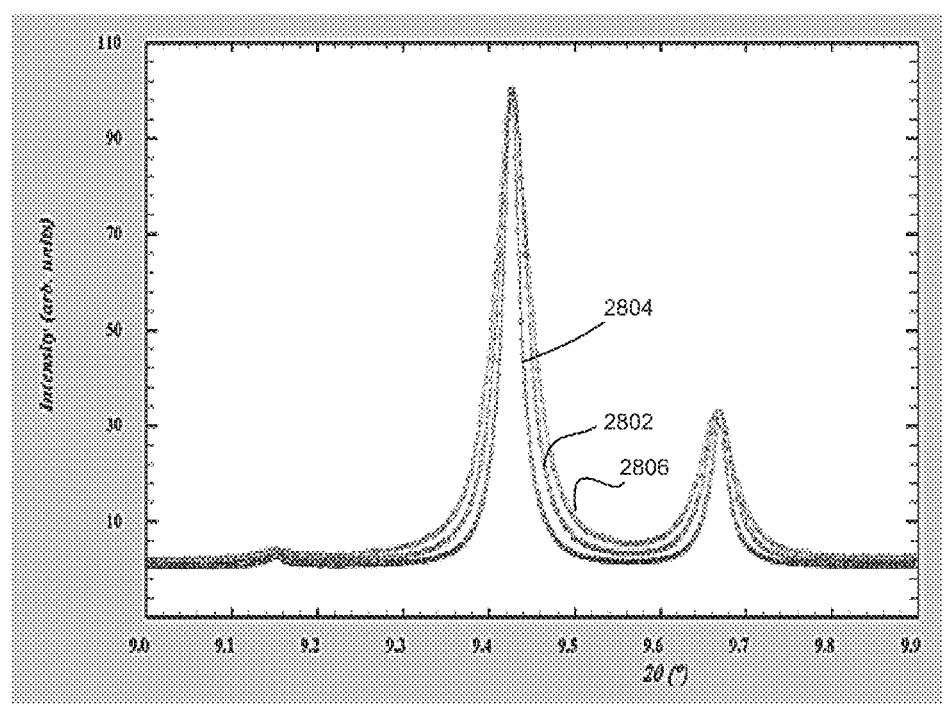
FIG. 28 shows a XRD of the LFP synthesized from spheniscidite compared to current LFP materials.

Turning to FIG. 28, a XRD shows diffraction data illustrating that the synthesized LFP 2802 has a crystallite size within the range of current LFP crystallite sizes 2804 and 2806, as indicated by the full width at half maximum of the peaks. As the synthesized LFP shows improved battery performance in lithium ion cells, the synthesized LFP may have a modified LFP phase behavior. For example, the LFP phase behavior of the synthesized LFP may include the extended solid solution range, wherein the extended solid solution range has a composition Li$_x$FePO$_4$, where x exceeds 0.2 at Li-poor compositions and is less than 0.8 at Li-rich compositions, at about 45° C.; and wherein the primary particles have a particle size in the range of 20 nm to 80 nm. In yet another example, the extended solid solution range has a composition Li$_x$FePO$_4$, where x exceeds 0.1 at Li-poor compositions, and is less than 0.15 at Li-rich compositions, at 0° C. for a primary particle size of 20 nm-80 nm may be seen for the LFP. Thus, the solid-solution range of the LFP having a primary particle size of 20-80 nm, wherein the particle size is comparable to current, stoichiometric, LFP materials, is extended. However, current LFP materials do not show the same improved battery performance, for example at low temperatures, and therefore do not present a similar phase behavior as the spheniscidite-derived LFP. The LFP phase behavior may be unique to the synthesized LFP as the LFP is prepared using a pure ammonium iron phosphate spheniscidite precursor, which is not present in current LFP materials.

Thus, the current disclosure provides an LFP material with specific characteristics synthesized from a pure spheniscidite, used as the primary or sole iron phosphate source, which surprisingly improves battery performance. The LFP material may be synthesized as described above from a plate-shaped single-phase ammonium iron phosphate precursor and a lithium source such that it exhibits a different solid phase behavior, specifically an extended solid-solution range as described above.

Various modifications of the present invention, in addition to those shown and described herein, will be apparent to those skilled in the art of the above description. Such modifications are also intended to fall within the scope of the appended claims.

It is appreciated that all reagents are obtainable by sources known in the art unless otherwise specified.

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

The foregoing description is illustrative of particular embodiments of the invention, but is not meant to be a limitation upon the practice thereof.

The foregoing discussion should be understood as illustrative and should not be considered limiting in any sense. While the inventions have been particularly shown and described with references to preferred embodiments thereof, it will be understood by those skilled in the art that various changes in form and details may be made therein without departing from the spirit and scope of the inventions as defined by the claims.

The corresponding structures, materials, acts and equivalents of all means or steps plus function elements in the claims below are intended to include any structure, material or acts for performing the functions in combination with other claimed elements as specifically claimed.

Finally, it will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:

1. A crystalline spheniscidite material for synthesizing lithium iron phosphate for use in an electrode, comprising:
from about 25 wt. % to about 30 wt. % iron;
from about 15 wt. % to about 20 wt. % phosphorous; and
from about 4.6 wt. % to about 5.0 wt. % ammonium;

wherein a molar ratio of phosphorus to iron is from about 1 to about 1.25;

wherein the crystalline spheniscidite material is an ammonium iron phosphate substantially free of impurities;

wherein the ammonium iron phosphate has a formula of $NH_4Fe_2(PO_4)_2OH*2H_2O$; and wherein the crystalline spheniscidite material has a plate-shape morphology.

2. The crystalline spheniscidite material of claim 1, wherein the crystalline spheniscidite material is a single-phase.

3. The crystalline spheniscidite material of claim 1, wherein the crystalline spheniscidite material has a surface area in a range of 20 $m^2/g$ to 25 $m^2/g$.

4. The crystalline spheniscidite material of claim 1, wherein an XRD includes no impurity peaks over 2%.

5. The crystalline spheniscidite material of claim 1, wherein an XRD includes no impurity peaks over 5%.

* * * * *